(12) United States Patent
Yanagihashi et al.

(10) Patent No.: US 7,579,712 B2
(45) Date of Patent: Aug. 25, 2009

(54) POWER SYSTEM PROTECTION SYSTEM

(75) Inventors: Ken Yanagihashi, Tokyo (JP); Mamoru Suzuki, Tokyo (JP); Takafumi Maeda, Tokyo (JP); Akira Ishibashi, Tokyo (JP); Yasuchika Nishitani, Tokyo (JP)

(73) Assignees: The Tokyo Electric Power Company, Tokyo (JP); Kabushiki Kaisha Toshiba, Tokyo (JP)

( * ) Notice: Subject to any disclaimer, the term of this patent is extended or adjusted under 35 U.S.C. 154(b) by 361 days.

(21) Appl. No.: 10/592,548

(22) PCT Filed: Mar. 16, 2004

(86) PCT No.: PCT/JP2004/003474

§ 371 (c)(1),
(2), (4) Date: Sep. 11, 2006

(87) PCT Pub. No.: WO2005/088801

PCT Pub. Date: Sep. 22, 2005

(65) Prior Publication Data

US 2007/0198985 A1    Aug. 23, 2007

(51) Int. Cl.
*H02J 3/14* (2006.01)
(52) U.S. Cl. ....................................... 307/38

(58) Field of Classification Search ............. 307/38–39; 718/105; 700/295
See application file for complete search history.

(56) References Cited

U.S. PATENT DOCUMENTS

2003/0187550 A1 * 10/2003 Wilson et al. ............... 700/295
2004/0010350 A1 * 1/2004 Lof et al. .................... 700/292

FOREIGN PATENT DOCUMENTS

| JP | 6-096216 | 3/1989 |
| JP | 01-227628 | 9/1989 |
| JP | 09-117064 | 5/1997 |
| JP | 2002-058159 | 2/2002 |

* cited by examiner

*Primary Examiner*—Albert W Paladini
*Assistant Examiner*—Carlos Amaya
(74) *Attorney, Agent, or Firm*—Muramatsu & Associates

(57) ABSTRACT

A power system protection system prevents a voltage drop resulting from the reactive power characteristic of a power system. A main device for acquiring a system electric quantity of one or a plurality of upper substations detects a voltage drop resulting from the reactive power characteristic of the power system and transmits a detection signal of the voltage drop to a terminal device for acquiring a system electric quantity of one or a plurality of lower substations. Each terminal device sequentially sheds loads starting from those suffering more from the influence of the voltage drop resulting from the reactive power characteristic based on the load voltage and load current of a load bus.

40 Claims, 26 Drawing Sheets

(a)

(b)

POWER SYSTEM PROTECTION SYSTEM

TECHNICAL FIELD

The present invention relates to a power system protection system for stably operating a power system.

BACKGROUND ART

In a power system, when a power flow increases suddenly or a considerable imbalance between demand and supply of reactive power occurs, there may be the case where the system voltage drops considerably. When the system voltage drops, an attempt is made to recover the system voltage to stably maintain the system voltage by the reactive power control by a generator linked to the power system or by the reactive power supply by a phase modifying equipment.

On the other hand, an increase in system load also causes the system voltage to drop and there may be the case where, for example, an increase in air-conditioning load at the power peak in summer causes the system voltage to drop considerably. The air-conditioning load has the same characteristic as that of an induction motor load, in which when the terminal voltage drops below a certain value, an action is produced to try to maintain the effective power at a constant level and an input current is increased. Therefore, if the terminal voltage drops due to an increase in air-conditioning load, the reactive power consumed increases suddenly and the system voltage of the power system drops all the more due to a sudden increase in reactive power, and it becomes difficult to stably maintain the system voltage.

As a measure to avoid a system voltage drop due to an increase in the load of a power system, a part of loads of the power system is shed when the system voltage drops below a predetermined value. In this case, depending on how a predetermined value of the system voltage is selected, there may be the case where unnecessary load shedding is performed at the time of regular voltage variations in the system voltage or of large electric power oscillation.

In view of this, as a measure to avoid a voltage drop resulting from the reactive power characteristic of an air-conditioning load, Japanese Patent Application Laid-open No. Hei 4-109818 has disclosed a system in which a load shedding command is issued when both the condition that the rate of change and the amount of change of the admittance of the system load are more than respective predetermined values and the condition that the bus voltage is less than a predetermined value are met continuously for a predetermined period of time. This enables early determination of voltage drop phenomenon and also appropriate detection of a gradual voltage drop phenomenon.

However, in a power system in which a plurality of bus-bars is connected by transmission network, high system loads are connected to the entire power system and power is supplied from each of the bus-bars, therefore, it is practically impossible to find the admittance of the system loads of the entire power system.

In the power system in which a plurality of bus-bars is connected by the transmission network, the respective system loads are connected to the respective bus-bars and power is supplied to the respective system loads from the respective bus-bars. Further, variations in the voltage of the bus-bar occur among the respective bus-bars or power is transmitted and received among the bus-bars. Therefore, even if connected by the transmission network, there are variations in various electrical characteristics among the respective bus-bars and it is difficult to handle various kinds of electric quantity as a single power system.

An object of the present invention is to provide a power system protection system capable of detecting a voltage drop resulting from the reactive power characteristic with high sensitivity and without erroneous determination and of suitably performing an protective operation even in a power system in which bus-bars are connected by transmission network.

DISCLOSURE OF THE INVENTION

The present invention is a power system protection system for stably operating a power system and is characterized by comprising a main device for acquiring a system electric quantity of one or a plurality of upper substations of a power system and a terminal device for acquiring a system electric quantity of one or a plurality of lower substations that receives power from the upper substation and supplies power to loads, wherein the main device includes a system voltage gradual drop determination unit that outputs a system voltage gradual drop determination signal when the voltage drop rate in a long time region exceeds a predetermined value based on a three-phase voltage of power system and terminates the outputting of the system voltage gradual drop determination signal when the three-phase voltage of power system exceeds a voltage recovery set value, a system voltage sudden drop determination unit that outputs a system voltage sudden drop determination signal when the voltage drop rate in a short time region exceeds a predetermined value based on a three-phase voltage of power system and terminates the outputting of the system voltage sudden drop determination signal when the three-phase voltage of power system exceeds the voltage recovery set value, an operation-prioritized selection unit that outputs an operation-prioritized selection signal early when the voltage drop in the three-phase voltage of power system is large and outputs the operation-prioritized selection signal late when the voltage drop is small, and an output permission unit that outputs an output permission signal in the event of the voltage sudden drop resulting from the reactive power characteristic, and the terminal device includes a load shedding output unit that sequentially sheds loads starting from those of the lower substations suffering more from the influence of the voltage drop resulting from the reactive power characteristic when receiving the system voltage gradual drop determination signal and the operation-prioritized selection signal from the main device and a load shedding selection output unit that selects loads causing the voltage sudden drop resulting from the reactive power characteristic and sequentially sheds the selected loads when receiving the system voltage sudden drop determination signal and the output permission signal from the main device.

The system voltage gradual drop determination unit may be configured so as to have predetermined values that become smaller from a short determination time region of a voltage gradual drop toward a long determination time region in a long time region, and quickly detect a large voltage drop rate in the short determination time region and detect a small voltage drop rate in the long determination time region. In addition, the system voltage sudden drop determination unit may be configured so as to terminate the outputting of the system voltage sudden drop determination signal when a short circuit fault or a grounding fault is detected. Moreover, the output permission unit may be configured so as to determine that the voltage sudden drop results from the reactive power characteristic and output an output permission signal when the load impedance viewed from an upper substation toward a lower substation falls within a predetermined range based on the three-phase voltage and current of power system.

Moreover, the load shedding output unit may be configured so as to determine the influence of the voltage drop resulting from the reactive power characteristic based on both or at least one of the load voltage and the load power factor of the loads connected to a lower substation and sequentially shed loads starting from those of the lower substation suffering more from the influence of the voltage drop resulting from the reactive power characteristic, or further, the load shedding output unit may be configured so as to output a load shedding command earlier for the lower substation having a lower load voltage and a smaller load power factor by shortening its time limit operation.

Further, the load shedding selection output unit may be configured so as to select loads causing the voltage sudden drop resulting from the reactive power characteristic based on both or at least one of the load voltage and the load power factor of the loads connected to a lower substation and sequentially shed the selected loads.

It is also preferable to set the voltage recovery set value of the system voltage gradual drop determination unit or the system voltage sudden drop determination unit to a voltage higher than the system voltage at which the system voltage gradual drop determination unit or the system voltage sudden drop determination unit has operated.

In addition, the power system protection system for stably operating a power system of the present invention is characterized by comprising a main device for acquiring a system electric quantity of one or a plurality of upper substations of a power system and a terminal device for acquiring a system electric quantity of one or a plurality of lower substations that receives power from an upper substation and supplies power to loads, wherein the main device includes a system voltage gradual drop determination unit that outputs a system voltage gradual drop determination signal when the voltage drop rate in a long time region exceeds a predetermined value based on a three-phase voltage of power system and terminates the outputting of the system voltage gradual drop determination signal when the three-phase voltage of power system exceeds a voltage recovery set value and a system voltage sudden drop determination unit that outputs a system voltage sudden drop determination signal when the voltage drop rate in a short time region exceeds a predetermined value based on a three-phase voltage of power system and terminates the outputting of the system voltage sudden drop determination signal when the three-phase voltage of power system exceeds the voltage recovery set value, and the terminal device includes a load shedding output unit that sequentially sheds loads starting from those of the lower substations suffering more from the influence of the voltage drop resulting from the reactive power characteristic when receiving the system voltage gradual drop determination signal from the main device and a load shedding selection output unit that sequentially sheds loads for which load shedding is permitted when receiving the system voltage sudden drop determination signal from the main device.

The system voltage gradual drop determination unit may be configured so as to have predetermined values that become smaller from a short determination time region of a voltage gradual drop toward a long determination time region in a long time region, and quickly detect a large voltage drop rate in the short determination time region and detect a small voltage drop rate in the long determination time region. The system voltage sudden drop determination unit may be configured so as to terminate the outputting of the system voltage sudden drop determination signal when a short circuit fault or a grounding fault is detected.

In addition, the load shedding output unit may be configured so as to determine the influence of the voltage drop resulting from the reactive power characteristic based on both or at least one of the load voltage and the load power factor of the loads connected to a lower substation and sequentially shed loads starting from those of the lower substations suffering more from the influence of the voltage drop resulting from the reactive power characteristic, or further, the load shedding output unit may be configured so as to output a load shedding command early for the lower substations having a lower load voltage and a smaller load power factor by shortening its time limit operation.

Further, the load shedding selection output unit may be configured so as to select loads causing the voltage sudden drop resulting from the reactive power characteristic based on both or at least one of the load voltage and the load power factor of the loads connected to a lower substation and sequentially shed the selected loads.

It is also preferable to set the voltage recovery set value of the system voltage gradual drop determination unit or the system voltage sudden drop determination unit to a voltage higher than the system voltage at which the system voltage gradual drop determination unit or the system voltage sudden drop determination unit has operated.

Moreover, the power system protection system for stably operating a power system of the present invention is characterized by comprising a main device for acquiring a system electric quantity of one or a plurality of upper substations of a power system and a terminal device for acquiring a system electric quantity of one or a plurality of lower substations that receives power from an upper substation and supplies power to loads, wherein the main device includes a system voltage gradual drop determination unit that outputs a system voltage gradual drop determination signal when the voltage drop rate in a long time region exceeds a predetermined value based on a three-phase voltage of power system and terminates the outputting of the system voltage gradual drop determination signal when the three-phase voltage of power system exceeds a voltage recovery set value and an operation-prioritized selection unit that outputs an operation-prioritized selection signal early when the voltage drop in the three-phase voltage of power system is large and outputs the operation-prioritized selection signal late when the voltage drop is small, and the terminal device includes a load shedding output unit that sequentially sheds loads starting from those of the lower substations suffering more from the influence of the voltage drop resulting from the reactive power characteristic when receiving both the system voltage gradual drop determination signal and the operation-prioritized selection signal from the main device.

The system voltage gradual drop determination unit may be configured so as to have predetermined values that become smaller from a short determination time region of a voltage gradual drop toward a long determination time region in a long time region, and quickly detect a large voltage drop rate in the short determination time region and detect a small voltage drop rate in the long determination time region.

In addition, the load shedding output unit may be configured so as to determine the influence of the voltage drop resulting from the reactive power characteristic based on both or at least one of the load voltage and the load power factor of the loads connected to a lower substation and sequentially shed loads starting from those of the lower substations suffering more from the influence of the voltage drop resulting from the reactive power characteristic, or further, the load shedding output unit may be configured so as to output a load shedding command earlier for the lower substations having a lower load voltage and a smaller load power factor by shortening its time limit operation.

It is also preferable to set the voltage recovery set value of the system voltage gradual drop determination unit to a voltage higher than the system voltage at which the system voltage gradual drop determination unit has operated.

In addition, the power system protection system for stably operating a power system of the present invention is characterized by comprising a main device for acquiring a system electric quantity of one or a plurality of upper substations of a power system and a terminal device for acquiring a system electric quantity of one or a plurality of lower substations that receives power from an upper substation and supplies power to loads, wherein the main device includes a system voltage gradual drop determination unit that outputs a system voltage gradual drop determination signal when the voltage drop rate in a long time region exceeds a predetermined value based on a three-phase voltage of power system and terminates the outputting of the system voltage gradual drop determination signal when the three-phase voltage of power system exceeds a voltage recovery set value, and the terminal device includes a load shedding output unit that sequentially sheds loads starting from those of the lower substations suffering more from the influence of the voltage drop resulting from the reactive power characteristic when receiving the system voltage gradual drop determination signal from the main device.

The system voltage gradual drop determination unit may be configured so as to have predetermined values that become smaller from a short determination time region of a voltage gradual drop toward a long determination time region in a long time region, and quickly detect a large voltage drop rate in the short determination time region and detect a small voltage drop rate in the long determination time region.

Moreover, the load shedding output unit may be configured so as to determine the influence of the voltage drop resulting from the reactive power characteristic based on both or at least one of the load voltage and the load power factor of the loads connected to a lower substation and sequentially shed loads starting from those of the lower substations suffering more from the influence of the voltage drop resulting from the reactive power characteristic, or further, the load shedding output unit may be configured so as to output a load shedding command earlier for the lower substations having a lower load voltage and a smaller load power factor by shortening its time limit operation.

It is also preferable to set the voltage recovery set value of the system voltage gradual drop determination unit to a voltage higher than the system voltage at which the system voltage gradual drop determination unit has operated.

In addition, the power system protection system for stably operating a power system of the present invention is characterized by comprising a main device for acquiring a system electric quantity of one or a plurality of upper substations of a power system and a terminal device for acquiring a system electric quantity of one or a plurality of lower substations that receive power from an upper substation and supplies power to loads, wherein the main device includes a system voltage sudden drop determination unit that outputs a system voltage sudden drop determination signal when the voltage drop rate in a short time region exceeds a predetermined value based on a three-phase voltage of power system and terminates the outputting of the system voltage sudden drop determination signal when the three-phase voltage of power system exceeds the voltage recovery set value and an output permission unit that outputs an output permission signal in the event of the voltage sudden drop resulting from the reactive power characteristic, and the terminal device includes a load shedding selection output unit that selects loads causing the voltage sudden drop resulting from the reactive power characteristic and sequentially sheds the selected loads when receiving the system voltage sudden drop determination signal and the output permission signal from the main device.

The system voltage sudden drop determination unit may be configured so as to terminate the outputting of the system voltage sudden drop determination signal when a short circuit fault or a grounding fault is detected. The output permission unit may be configured so as to determine that the voltage sudden drop results from the reactive power characteristic and output an output permission signal when the load impedance viewed from an upper substation toward a lower substation falls within a predetermined range based on three-phase voltage and current of power system.

Further, the load shedding selection output unit may be configured so as to select loads causing the voltage sudden drop resulting from the reactive power characteristic based on both or at least one of the load voltage and the load power factor of the loads connected to a lower substation and sequentially shed the selected loads.

It is also preferable to set the voltage recovery set value of the system voltage sudden drop determination unit to a voltage higher than the system voltage at which the system voltage sudden drop determination unit has operated.

In addition, the power system protection system for stably operating a power system of the present invention is characterized by comprising a main device for acquiring a system electric quantity of one or a plurality of upper substations of a power system and a terminal device for acquiring a system electric quantity of one or a plurality of lower substations that receives power from an upper substation and supplies power to loads, wherein the main device includes a system voltage sudden drop determination unit that outputs a system voltage sudden drop determination signal when the voltage drop rate in a short time region exceeds a predetermined value based on a three-phase voltage of power system and terminates the outputting of the system voltage sudden drop determination signal when the three-phase voltage of power system exceeds the voltage recovery set value, and the terminal device includes a load shedding selection output unit that selects loads causing the voltage sudden drop resulting from the reactive power characteristic and sequentially sheds the selected loads when receiving the system voltage sudden drop determination signal from the main device.

The system voltage sudden drop determination unit may be configured so as to terminate the outputting of the system voltage sudden drop determination signal when a short circuit fault or a grounding fault is detected. Also, the load shedding selection output unit may be configured so as to select loads causing the voltage sudden drop resulting from the reactive power characteristic based on both or at least one of the load voltage and the load power factor of the loads connected to a lower substation and sequentially shed the selected loads.

It is also preferable to set the voltage recovery set value of the system voltage sudden drop determination unit to a voltage higher than the system voltage at which the system voltage sudden drop determination unit has operated.

In addition, the power system protection system for stably operating a power system of the present invention is characterized by comprising a system voltage gradual drop determination unit that outputs a system voltage gradual drop determination signal when the voltage drop rate in a long time region exceeds a predetermined value based on a three-phase voltage of power system of one or a plurality of substations of a power system and terminates the outputting of the system voltage gradual drop determination signal when the three-phase voltage of power system exceeds a voltage recovery set value, a system voltage sudden drop determination unit that outputs a system voltage sudden drop determination signal when the voltage drop rate in a short time region exceeds a predetermined value based on a three-phase voltage of power system and terminates the outputting of the system voltage sudden drop determination signal when the three-phase voltage of power system exceeds the voltage recovery set value, an operation-prioritized selection unit that outputs an operation-prioritized selection signal early when the voltage drop in the three-phase voltage of power system is large and outputs the operation-prioritized selection signal late when the voltage drop is small, an output permission unit that outputs an output permission signal in the event of the voltage sudden drop resulting from the reactive power characteristic, a load shedding output unit that sequentially sheds loads starting from those suffering more from the influence of the voltage drop resulting from the reactive power characteristic when inputting the system voltage gradual drop determination signal and the operation-prioritized selection signal, and a load shedding selection output unit that selects loads causing the voltage sudden drop resulting from the reactive power characteristic and sequentially sheds the selected loads when inputting the system voltage sudden drop determination signal and the output permission signal.

Moreover, the power system protection system for stably operating a power system of the present invention is characterized by comprising a system voltage gradual drop determination unit that outputs a system voltage gradual drop determination signal when the voltage drop rate in a long time region exceeds a predetermined value based on a three-phase voltage of power system of one or a plurality of substations of a power system and terminates the outputting of the system voltage gradual drop determination signal when the three-phase voltage of power system exceeds a voltage recovery set value, a system voltage sudden drop determination unit that outputs a system voltage sudden drop determination signal when the voltage drop rate in a short time region exceeds a predetermined value based on a three-phase voltage of power system and terminates the outputting of the system voltage sudden drop determination signal when the three-phase voltage of power system exceeds a voltage recovery set value, a load shedding output unit that sequentially sheds loads starting from those suffering more from the influence of the voltage drop resulting from the reactive power characteristic when inputting the system voltage gradual drop determination signal, and a load shedding selection output unit that sheds loads for which load shedding is permitted when inputting the system voltage sudden drop determination signal.

Further, the power system protection system for stably operating a power system of the present invention is characterized by comprising a system voltage gradual drop determination unit that outputs a system voltage gradual drop determination signal when the voltage drop rate in a long time region exceeds a predetermined value based on a three-phase voltage of power system of one or a plurality of substations of a power system and terminates the outputting of the system voltage gradual drop determination signal when the three-phase voltage of power system exceeds a voltage recovery set value, an operation-prioritized selection unit that outputs an operation-prioritized selection signal early when the voltage drop in the three-phase voltage of power system is large and outputs the operation-prioritized selection signal late when the voltage drop is small, and a load shedding output unit that sequentially sheds loads starting from those suffering more from the influence of the voltage drop resulting from the reactive power characteristic when inputting both the system voltage gradual drop determination signal and the operation-prioritized selection signal.

Moreover, the power system protection system for stably operating a power system of the present invention is characterized by comprising a system voltage gradual drop determination unit that outputs a system voltage gradual drop determination signal when the voltage drop rate in a long time region exceeds a predetermined value based on a three-phase voltage of power system of one or a plurality of substations of a power system and terminates the outputting of the system voltage gradual drop determination signal when the three-phase voltage of power system exceeds a voltage recovery set value and a load shedding output unit that sequentially sheds loads starting from those suffering more from the influence of the voltage drop resulting from the reactive power characteristic when inputting the system voltage gradual drop determination signal.

Furthermore, the power system protection system for stably operating a power system of the present invention is characterized by comprising a system voltage sudden drop determination unit that outputs a system voltage sudden drop determination signal when the voltage drop rate in a short time region exceeds a predetermined value based on a three-phase voltage of power system of one or a plurality of substations of a power system and terminates the outputting of the system voltage sudden drop determination signal when the three-phase voltage of power system exceeds a voltage recovery set value, an output permission unit that outputs an output permission signal in the event of the voltage sudden drop resulting from the reactive power characteristic, and a load shedding selection output unit that selects loads causing the voltage sudden drop resulting from the reactive power characteristic and sequentially sheds the selected loads when inputting the system voltage sudden drop determination signal and the output permission signal.

In addition, the power system protection system for stably operating a power system of the present invention is characterized by comprising a system voltage sudden drop determination unit that outputs a system voltage sudden drop determination signal when the voltage drop rate in a short time region exceeds a predetermined value based on a three-phase voltage of power system of one or a plurality of substations of a power system and terminates the outputting of the system voltage sudden drop determination signal when the three-phase voltage of power system exceeds a voltage recovery set value and a load shedding selection output unit that selects loads causing the voltage sudden drop resulting from the reactive power characteristic and sequentially sheds the selected loads when inputting the system voltage sudden drop determination signal.

BEST MODES FOR CARRYING OUT THE INVENTION

Figure 1:
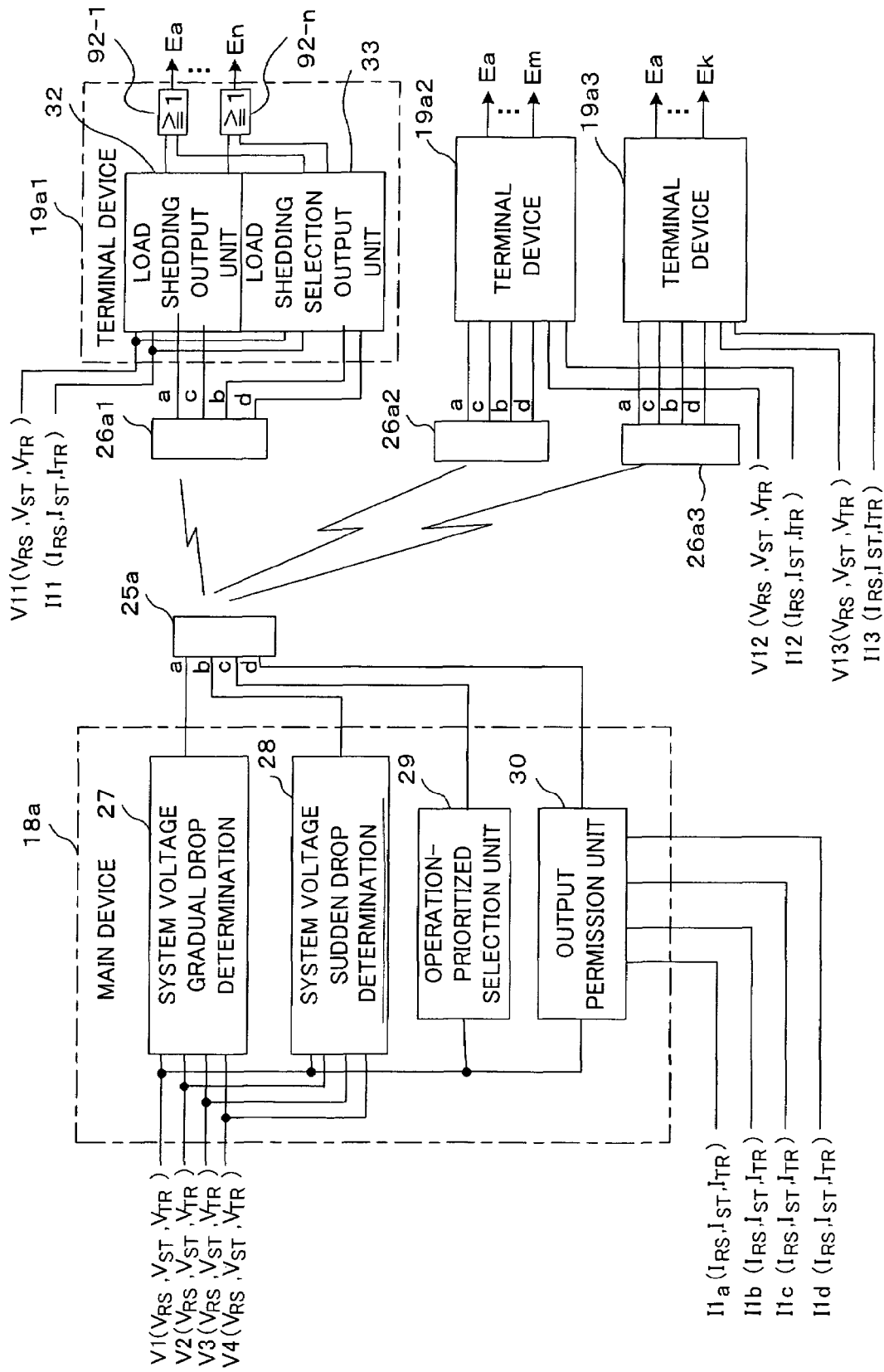
FIG. 1 is a configuration diagram of a power system protection system according to a first embodiment of the present invention.
Figure 2:
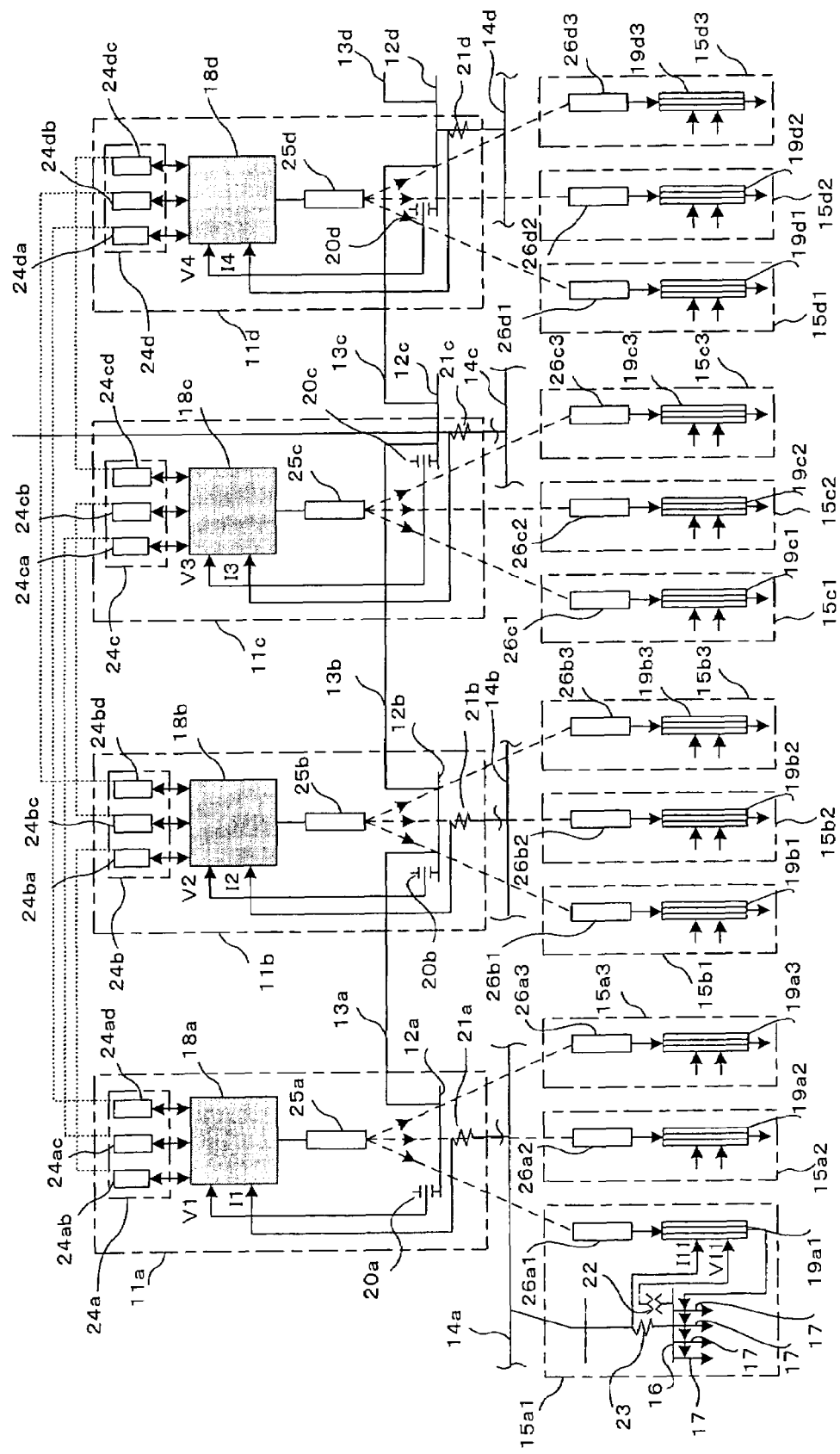
FIG. 2 is a general configuration diagram of a power system to which a power system protection system according to the first embodiment of the present invention is applied.

Embodiments of the present invention are described below. FIG. 1 is a configuration diagram of a power system protection system according to a first embodiment of the present invention. FIG. 2 is a general configuration diagram of a power system to which a power system protection system according to the first embodiment of the present invention is applied.

In FIG. 2, a plurality of upper substations 11a to 11d is provided in an upper system of a power system and bus-bars 12a to 12d of the upper substations 11a to 11d are connected by transmission network 13a to 13d, constituting a network configuration. The configuration is such that respective lower power transmission lines 14a to 14d are connected to the respective bus-bars 12a to 12d of the upper substations 11a to 11d, supplying power to a plurality of lower substations 15a1 to 15d3. Here, the upper substation is one in the upper system of the power system and the lower substation is one that receives power directly or indirectly from the upper substation. For example, each of the lower substations 15a1 to 15a3 may be one that receives power from the upper substation 11a and supplies power directly to loads or one that receives power from the upper substation 11a and supplies power further to a next lower substation. The lower substation that supplies power directly to loads is explained below, however, the explanation can be applied similarly to the case of the lower substation that supplies power further to a lower substation because the difference is only in that a lower substation is interposed therebetween.

In each of the lower substations 15a1 to 15d3, power is supplied to loads from a load bus 16 via a feeder 17. By the way, in FIG. 2, the load bus 16 and the feeder 17 are shown only for the lower substation 15a1, however, each of other lower substations 15a2 to 15d3 also includes the load bus 16 and the feeder 17 similarly, although not shown.

The power system protection system consists of main devices 18a to 18d provided in the upper substations 11a to 11d and terminal devices 19a1 to 19d3 provided in the lower substations 15a1 to 15d3. In FIG. 2, the respective main devices 18a to 18d are provided in the respective four upper substations 11a to 11d, however, it is not necessary to provide the main device in each upper substation and it is only necessary to provide the main device at least in one of the plurality of upper substations. The case where the respective main devices 18a to 18d are provided in the respective four upper substations 11a to 11d is explained below.

In the respective upper substations 11a to 11d, respective voltage transformers 20a to 20d to detect respective three-phase voltage of power systems V1 to V4 are provided and respective current transformers 21a to 21d to detect respective three-phase system currents I1 to I4 are also provided. Similarly, in the respective lower substations 15a1 to 15d3, respective voltage transformers 22 to detect respective three-phase load voltages V11 of the load buses 16 to which a plurality of feeders 17 is connected are provided and similarly, respective current transformers 23 to detect respective three-phase load currents I11 that flow through all of the feeders 17 from the load buses 16 are provided.

As described above, the power system protection system consists of the plurality of the main devices 18a to 18d provided in the upper substations 11a to 11d and the plurality of the terminal devices 19a1 to 19d3 provided in the lower substations 15a1 to 15d3. The main devices 18a to 18d detect a voltage drop of the power system and the terminal devices 19a1 to 19d3 shed the respective loads connected to the respective feeders 17 of the load buses 16 in the lower substations 15a1 to 15d3 based on the commands from the main devices 18a to 18d. Since the plurality of the main devices 18a to 18d and the plurality of the terminal devices 19a1 to 19d3 have the same configuration, respectively, the main device 18a and the terminal device 19a1 are explained below.

The main device 18a receives the three-phase voltage of power system V1 of the upper substation 11a of its own from the voltage transformer 20a and the three-phase system current I1 from the current transformer 21a. Further, the main device 18a receives the three-phase voltage of power systems V2 to V4 detected by the respective voltage transformers 20b to 20d in the other plurality of the upper substations 11b to 11d via a signal terminal station device 24a. The main device 18a detects whether or not a voltage drop has occurred in the power system based on the respective three-phase voltage of power systems V1 to V4 in the upper substation 11a of its own and the other plurality of the upper substations 11b to 11d and transmits a detection signal to signal terminal station devices 26a1 to 26a3 of the lower substations 15a1 to 15a3 connected to the upper substation 11a of its own via a signal terminal station device 25a.

The terminal device 19a1 receives the three-phase load voltage V11 of the load bus 16 detected by the voltage transformer 22 and the three-phase load current I11 detected by the current transformer 23 and at the same time, receives the detection signal from the main device 18a by the signal terminal station device 26a1 and sheds the loads connected to the load bus 16.

In FIG. 1, the main device 18a comprises a system voltage gradual drop determination unit 27 that detects the voltage drop rate in a long time region of the order of several seconds to several minutes and outputs a system voltage gradual drop determination signal a, system voltage sudden drop determination unit 28 that detects the voltage drop rate in a short time region of the order of not more than several seconds and outputs a system voltage sudden drop determination signal b, an operation-prioritized selection unit 29 that outputs an operation-prioritized selection signal c early when the voltage drop in the three-phase voltage of power systems V1 to V4 is large and outputs the operation-prioritized selection signal c late when the voltage drop is small, and an output permission unit 30 that identifies the voltage sudden drop in the event of system failure and the voltage sudden drop resulting from the reactive power characteristic and outputs an output permission signal d in the event of the voltage sudden drop resulting from the reactive power characteristic.

The system voltage gradual drop determination unit 27 receives the three-phase voltage of power system V1 ($V_{RS}$, $V_{ST}$, $V_{TR}$) of the upper substation 11a of its own and the respective three-phase voltage of power systems V2 ($V_{RS}$, $V_{ST}$, $V_{TR}$), V3 ($V_{RS}$, $V_{ST}$, $V_{TR}$), and V4 ($V_{RS}$, $V_{ST}$, $V_{TR}$) of the other plurality of the upper substations 11b to 11d, calculates the voltage drop rate in the long time region of the order of several seconds to several minutes based on the three-phase voltage of power systems V1 to V4 of the respective upper substations 11a to 11d, and outputs the system voltage gradual drop determination signal a when the voltage drop rate exceeds a predetermined value. Here, the voltage drop rate is the gradient of a straight line that represents the trend of voltage change of the system voltage. Further, the three-phase voltage of power systems V1 to V4 show the case where respective voltages $V_{RS}$, $V_{ST}$, and $V_{TR}$ between lines of the three-phases (R phase, S phase, and T phase) are inputted, however, phase voltages $V_R$, $V_S$, and $V_T$ that are voltages with reference to the ground of the three phases may be inputted as the three-phase voltage of power systems V1 to V4. In the following explanation, the case where the voltages between lines ($V_{RS}$, $V_{ST}$, $V_{TR}$) are used is explained.

The system voltage sudden drop determination unit 28 receives the three-phase voltage of power system V1 ($V_{RS}$, $V_{ST}$, $V_{TR}$) of the upper substation 11a of its own and the respective three-phase voltage of power systems V2 ($V_{RS}$, $V_{ST}$, $V_{TR}$), V3 ($V_{RS}$, $V_{ST}$, $V_{TR}$), and V4 ($V_{RS}$, $V_{ST}$, $V_{TR}$) of the other plurality of the upper substations 11b to 11d, calculates the voltage drop rate in the short time region of the order of several seconds based on the three-phase voltage of power systems V1 to V4 of the respective upper substations, and outputs the system voltage sudden drop determination signal b when the voltage drop rate exceeds a predetermined value.

Further, the operation-prioritized selection unit 29 receives the three-phase voltage of power system V1 ($V_{RS}$, $V_{ST}$, $V_{TR}$) of the upper substation 11a of its own and outputs the operation-prioritized selection signal c as to whether or not the system voltage gradual drop determination signal of the system voltage gradual drop determination unit 27 of its own is outputted with priority. The output permission unit 30 receives the three-phase voltage of power system V1 ($V_{RS}$, $V_{ST}$, $V_{TR}$) of the upper substation 11a of its own and respective three-phase system currents I1a ($I_{RS}$, $I_{ST}$, $I_{TR}$), I1b ($I_{RS}$, $I_{ST}$, $I_{TR}$), I1c ($I_{RS}$, $I_{ST}$, $I_{TR}$), and I1d ($I_{RS}$, $I_{ST}$, $I_{TR}$) of the plurality of transformers in the upper substation 11a, determines whether or not the voltage sudden drop results from the reactive power characteristic, and outputs the output permission signal d when the voltage sudden drop results from the reactive power characteristic. Here, $I_{RS}$ is a vector difference between an R-phase phase current and an S-phase phase current, and similarly, $I_{ST}$ is a vector difference between the S-phase phase current and a T-phase phase current and $I_{TR}$ is a vector difference between the T-phase phase current and the R-phase phase current.

Then, the system voltage gradual drop determination signal a, the system voltage sudden drop determination signal b, the operation-prioritized selection signal c, and the output permission signal d are transmitted by the signal terminal station device 25a to the signal terminal station devices 26a1 to 26a3 of the terminal devices 19a1 to 19a3 in the lower substations 15a1 to 15a3 connected to the upper substation 11a of its own.

Since the terminal devices 19a1 to 19a3 have the same configuration, the terminal device 19a1 is explained. The terminal device 19a1 comprises a load shedding output unit 32 and a load shedding selection output unit 33 and load shedding commands from the load shedding output unit 32 and the load shedding selection output unit 33 are inputted to logical sum circuits 92-1 to 92-n, respectively, and when load shedding commands are outputted from either the load shedding output unit 32 or the load shedding selection output unit 33, respective load shedding commands Ea to En are outputted to the respective feeders 17 connected to the load bus 16 via the respective logical sum circuits 92-1 to 92-n.

The load shedding output unit 32 receives the system voltage gradual drop determination signal a from the system voltage gradual drop determination unit 27 and the operation-prioritized selection signal c from the operation-prioritized selection unit 29 and upon receipt of both the system voltage gradual drop determination signal a and the operation-prioritized selection signal c, outputs the load shedding commands to the logical sum circuits 92-1 to 92-n in the order based on the load voltage and the load power factor of the load bus 16 of the lower substation 15a1.

On the other hand, the load shedding selection output unit 33 receives the system voltage sudden drop determination signal b from the system voltage sudden drop determination unit 28 and the output permission signal d from the output permission unit 30 and upon receipt of both the system voltage sudden drop determination signal b and the output permission signal d, selects loads causing the voltage sudden drop resulting from the reactive power characteristic and sequentially outputs the load shedding commands for the selected loads to the logical sum circuits 92-1 to 92-n. In other words, the load shedding selection output unit 33 selects, for example, loads causing the voltage sudden drop resulting from the reactive power characteristic based on both or at least one of the load voltage and the load power factor of the load connected to the lower substation and sequentially outputs the load shedding commands for the selected loads to the logical sum circuits 92-1 to 92-n. The details are described later.

The load shedding commands Ea to En are outputted to the respective feeders 17 connected to the load bus 16. In other words, in the terminal device 19a1, the number of feeders 17 is n, therefore, the load shedding commands Ea to En are outputted, in the terminal device 19a2, the number of feeders 17 is m, therefore, the load shedding commands Ea to Em are outputted, and in the terminal device 19a3, the number of feeders 17 is k, therefore, the load shedding commands Ea to Ek are outputted.

Here, the voltage drop resulting from the reactive power characteristic in the power system occurs in the two cases, that is, in one of the cases, the voltage drops in the long time region of the order of several seconds to several minutes and in the other case, the voltage drops in the short time region of the order of several seconds, and the system voltage gradual drop determination unit 27 and the system voltage sudden drop determination unit 28 are provided in the main device 18a in order to make it possible to detect the voltage drop without delay in either case.

Further, the system voltages V1 to V4 of the upper substation 11a of its own and the other plurality of upper substations 11b to 11d are inputted, respectively, in order to improve the reliability of voltage drop detection. Furthermore, the voltage drop characteristic resulting from the reactive power differs between the case where the voltage drops in the long time region of the order of several seconds to several minutes and the case where the voltage drops in the short time region of the order of several seconds, therefore, the load shedding output unit 32 and the load shedding selection output unit 33 are provided in the terminal device 19a1 in order to adapt to the respective characteristics suitably. The details are described later.

Figure 3:
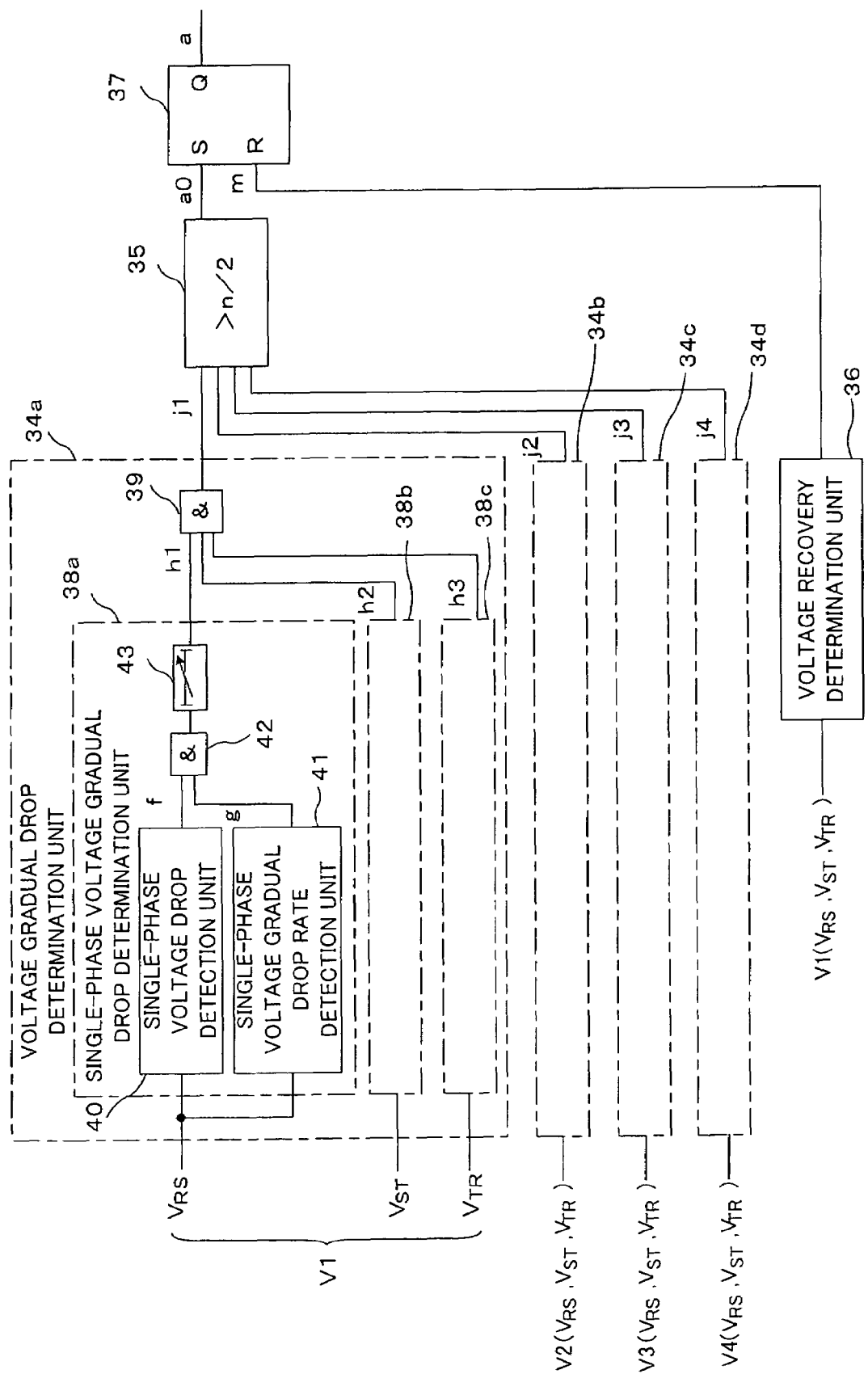
FIG. 3 is a detailed configuration diagram of a system voltage gradual drop determination unit in the first embodiment of the present invention.

FIG. 3 is a detailed configuration diagram of the system voltage gradual drop determination unit 27 of the main device 18a. The system voltage gradual drop determination unit 27 comprises a plurality of voltage gradual drop determination units 34a to 34d, a majority decision calculation unit 35, a voltage recovery determination unit 36, and a signal output unit 37.

The respective voltage gradual drop determination units 34a to 34d are provided corresponding to the respective three-phase voltage of power systems V1 to V4 of the upper substation 11a of its own and the other plurality of the upper substations 11b to 11d, and determine the voltage gradual drop of the respective three-phase voltage of power systems V1 to V4. The plurality of voltage gradual drop determination units 34a to 34d has the same configuration, therefore, only the voltage gradual drop determination unit 34a is described in detail in FIG. 3 and the details of the voltage gradual drop determination units 34b to 34d are omitted. The voltage gradual drop determination unit 34a is explained below.

The voltage gradual drop determination unit 34a comprises three single-phase voltage gradual drop determination units 38a to 38c and a logical product circuit 39. The single-phase voltage gradual drop determination units 38a to 38c are provided corresponding to the respective single-phase voltages $V_{RS}$, $V_{ST}$, and $V_{TR}$ of the three-phase voltage of power system V1 of the upper substation 11a of its own and judge the voltage gradual drop in the long time region of each phase. The single-phase voltage gradual drop determination units 38a to 38c have the same configuration, therefore, the single-phase voltage gradual drop determination unit 38a is explained.

The single-phase voltage gradual drop determination unit 38a comprises a single-phase voltage drop detection unit 40, a single-phase voltage gradual drop rate detection unit 41, a logical product circuit 42, and a timer 43 and determines whether or not each single-phase voltage of the three-phase voltage of power system gradually drops.

The single-phase voltage drop detection unit 40 determines whether or not the single-phase voltage $V_{RS}$ of the three-phase voltage of power system V1 drops below a predetermined value and outputs a single-phase voltage drop signal f to the logical product circuit 42 when detecting that the voltage drops below the predetermined value. Further, the single-phase voltage gradual drop rate detection unit 41 detects the voltage drop rate of the single-phase voltage $V_{RS}$ of the three-phase voltage of power system V1 in the long time region of the order of several seconds to several minutes and outputs a single-phase voltage gradual drop rate detection signal g to the logical product circuit 42 when the voltage drop rate exceeds a predetermined value. The logical product circuit 42 calculates a logical product of the single-phase voltage drop signal f and the single-phase voltage gradual drop rate detection signal g and outputs an output signal to the timer 43 when both the single-phase voltage drop signal f and the single-phase voltage gradual drop rate detection signal g are established. The timer 43 outputs a single-phase voltage gradual drop determination signal h1 to the logical product circuit 39 when a state in which both the single-phase voltage drop signal f and the single-phase voltage gradual drop rate detection signal g are established continues for a predetermined period of time.

As described above, the single-phase voltage gradual drop determination unit 38a determines that a voltage gradual drop has occurred in the single-phase voltage $V_{RS}$ of the three-phase voltage of power system V1 when the voltage drops below a predetermined value and the voltage drop rate exceeds a predetermined value, and outputs the single-phase voltage gradual drop determination signal h1. Here, the timer 43 is provided in order to detect without fail the voltage gradual drop of the single-phase voltage $V_{RS}$ by confirming that its state continues.

For the other single-phase voltages $V_{ST}$ and $V_{TR}$ of the three-phase voltage of power system V1 similarly, respective single-phase voltage gradual drop determination signals h2 and h3 are outputted from the respective single-phase voltage gradual drop determination units 38b and 38c. These single-phase voltage gradual drop determination signals h1, h2, and h3 are inputted to the logical product circuit 39 of the single-phase voltage gradual drop determination unit 34a. Then, when all of the single-phase voltage gradual drop determination signals h1, h2, and h3 are established, the voltage gradual drop determination unit 34a determines that the three-phase voltage of power system V1 in the upper substation 11a of its own has dropped gradually and outputs a voltage gradual drop determination signal j1.

For the three-phase voltage of power systems V2 to V4 in the other upper substations 11b to 11d similarly, the voltage gradual drop determination units 34b to 34d determine that the three-phase voltage of power systems V2 to V4 in the upper substations 11b to 11d have dropped gradually and outputs voltage gradual drop determination signals J2 to J4.

The majority decision calculation unit 35 receives the voltage gradual drop determination signals j1 to j4 from the voltage gradual drop determination units 34a to 34d and outputs the system voltage gradual drop determination signal a to the signal output unit 37 based on the majority decision principle. In this case, the majority decision calculation unit 35 performs majority decision calculation of the input signal from the normal devices. For example, failure in the main devices 18a to 18d themselves of the upper substation 11a of its own and the other upper substations 11b to 11d or failure in the transmission system among the main devices 18a to 18d is detected, the voltage gradual drop determination signal j from the defective device is excluded from the majority decision calculation. For example, when all of the devices are normal, if three or more of the four voltage gradual drop determination signals j1 to j4 are established, the system voltage in the power system is determined to have dropped gradually and a system voltage gradual drop determination signal a0 is outputted to the signal output unit 37. On the other hand, when three of the devices are normal and one of the devices is abnormal, if two or more of the three voltage gradual drop determination signals are established, the system voltage in the power system is determined to have dropped gradually and the system voltage gradual drop determination signal a0 is outputted to the signal output unit 37 as a result. When inputting the system voltage gradual drop determination signal a0, the signal output unit 37 maintains the system voltage gradual drop determination signal a0 and outputs the system voltage gradual drop determination signal a.

On the other hand, the voltage recovery determination unit 36 detects the voltage recovery of the three-phase voltage of power system V1 of the upper substation 11a of its own. Whether or not each single-phase voltage of the three-phase voltage of power system V1 in the upper substation 11a of its own has exceeded a voltage recovery set value determined in advance is determined and it is determined that the voltage is recovered when all of the single-phase voltages exceed the voltage recovery set value, and a voltage recovery signal m is outputted to the signal output unit 37. The voltage recovery set value of the voltage recovery determination unit 36 is set to a value greater than the system voltage when the voltage gradual drop has occurred. This is to secure the recovery from the voltage drop by setting the voltage recovery set value for determining the voltage recovery to a greater value. When the voltage recovery signal m is inputted from the voltage recovery determination unit 36, the signal output unit 37 releases the hold of the system voltage gradual drop determination signal a0 from the majority decision calculation unit 35. Therefore, the outputting of the system voltage gradual drop determination signal a from the signal output unit 37 is terminated.

As described above, the system voltage gradual drop determination unit 27 outputs the system voltage gradual drop determination signal a when the system voltage in the power system has dropped gradually and terminates the system voltage determination signal a when the voltage has recovered, therefore, when the voltage gradual drop has occurred, the load is shed and the load shedding due to the voltage gradual drop is terminated when the voltage gradual drop has been recovered.

Figure 4:
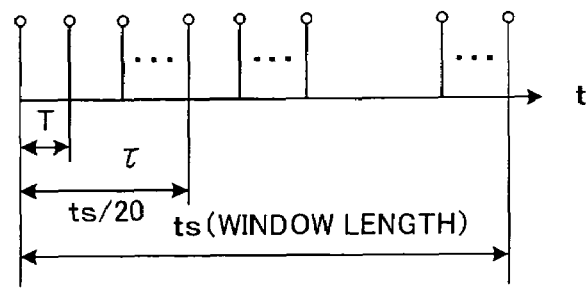
FIG. 4 is an explanatory diagram of the contents of detection processing of the voltage drop rate in a long time region in a single-phase voltage drop rate determination unit in the first embodiment of the present invention.
Figure 4:
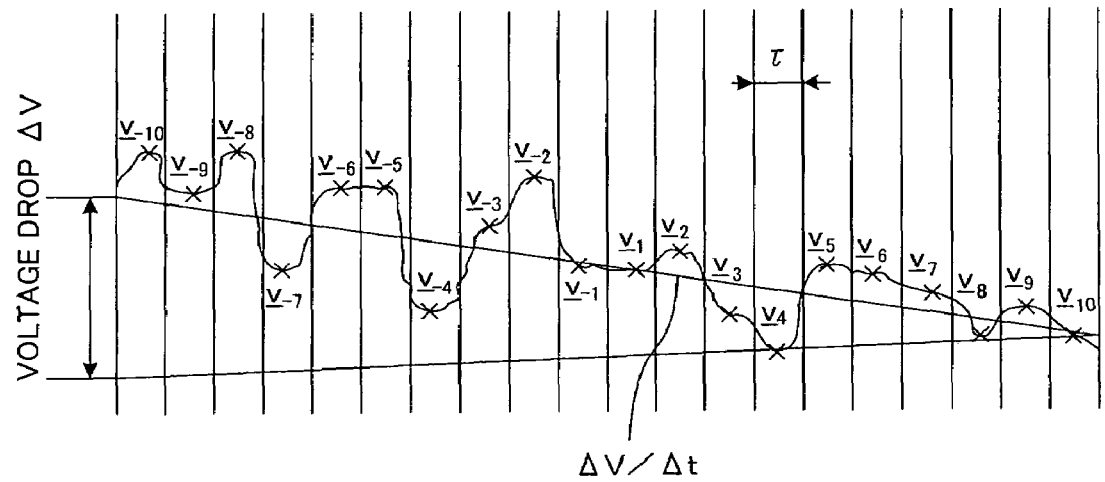

FIG. 4 is an explanatory diagram of the contents of detection processing of voltage drop rate in the long time region of the single-phase voltage gradual drop rate detection unit 41. FIG. 4(a) is an explanatory diagram of the voltage data when detecting the voltage drop rate in the long time region. The single-phase voltage gradual drop rate detection unit 41 samples, collects, and stores data in chronological order at a cycle equivalent to the cycle T of the single-phase voltage V of the system voltage V1. Then, an average vi (i=−10 to −1, 1 to 10) of the sampled values at a time period $\tau(\tau=ts/20)$, which is 1/20 of a predetermined window length ts, is found and by using twenty averages vi thus found, a rate of change of voltage $\Delta V/\Delta t$ is found by the least squares method, as shown in FIG. 4(b). When the rate of change of voltage $\Delta V/\Delta t$ exceeds a voltage change rate set value a determined in advance, the single-phase voltage gradual drop rate detection unit 41 outputs the single-phase voltage gradual drop determination signal g as a result.

Here, as another example of the system voltage gradual drop determination unit 27, it may also be possible to configure such that a plurality of the single-phase voltage gradual drop detection units 41 having different predetermined window lengths ts and voltage change rate set values a are prepared, the respective lengths (the predetermined window length ts) of determination time of the voltage drop rate in the long time region comprise a plurality of different voltage gradual drop determination units, and thus the time required for the detection of voltage gradual drop is not delayed even if the voltage drop rate increases.

Figure 5:
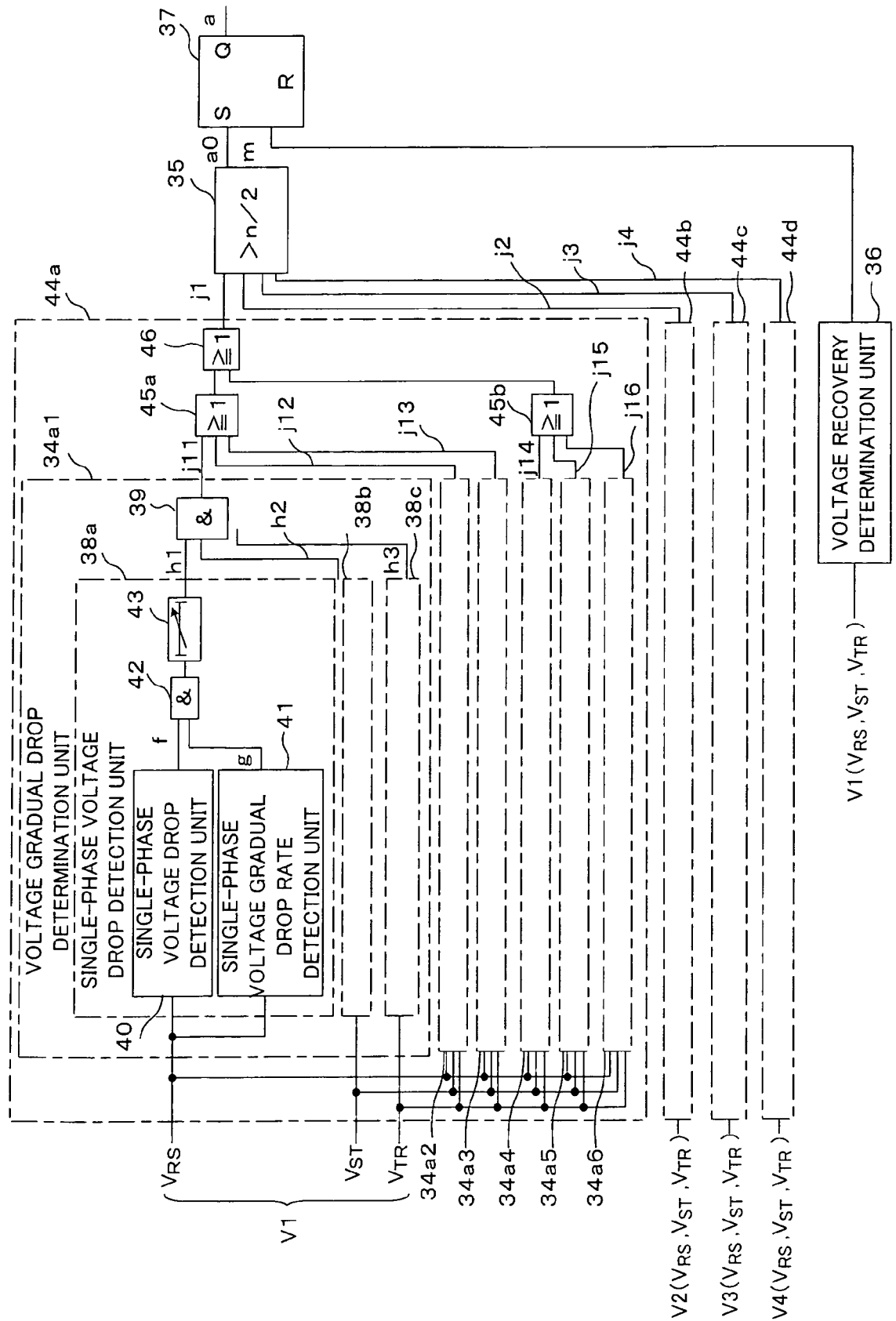
FIG. 5 is a detailed configuration diagram showing another example of the system voltage gradual drop determination unit in the first embodiment of the present invention.

FIG. 5 is a configuration diagram of the system voltage gradual drop determination unit 27 in which the respective lengths (the predetermined window length ts) of determination time of the voltage drop rate in the long time region comprise a plurality of different voltage gradual drop determination units. Instead of the voltage gradual drop determination unit 34a in FIG. 3, a voltage gradual drop determination unit group 44a having a plurality of voltage gradual drop determination units 34a1 to 34a6 with the different lengths (the predetermined window length ts) of determination time of the voltage drop rate in the long time region is provided.

In FIG. 5, since the voltage gradual drop determination unit groups 44a to 44d have the same configuration, the voltage gradual drop determination unit group 44a is explained. The configuration of the voltage gradual drop determination units 34a1 to 34a6 is the same as that of the single-phase voltage gradual drop determination units 38a to 38c except in that the predetermined window length ts and the voltage change rate set value a of the single-phase voltage gradual drop rate detection unit 41 are different.

In other words, in FIG. 5, the voltage gradual drop determination unit group 44a comprises the six voltage gradual drop determination units 34a1 to 34a6 and six kinds of the predetermined window lengths ts and the voltage change rate set values a of the single-phase voltage gradual drop rate detection unit 41 are prepared. For example, as the predetermined window length ts, six kinds of window lengths ts1 to ts6 are prepared in the range of about several seconds to one hundred and tens of seconds and voltage change rate set values a1 to a6 corresponding to the respective window lengths ts to ts6 are prepared. Then, the single-phase voltage gradual drop rate detection units 41 having the window lengths ts1 to ts6 are assigned to the voltage gradual drop determination units 34a1 to 34a6.

For example, the voltage gradual drop determination unit 34a1 assigned with the window length ts1 of about several seconds collects sampled values vi of the single-phase voltage at a cycle substantially the same as that of the system frequency. When the system frequency is assumed to be 50 Hz, the number of sampled values vi of the single-phase voltage in the window length ts1 of about several seconds is about 100 to 500 and if divided by 20, the number in the time period τ is about 5 to 25. The average value vi of the 5 to 25 sampled values vi is found and similarly, the average value vi in each of the 20 divided time periods τ is found. Then, by using the 20 average values vi thus found, the rate of change of voltage ΔV/Δt is found and the voltage gradual drop in the long time region. of about several seconds is detected by comparison with the voltage change rate set value a1. Similarly, in the same manner, the voltage gradual drop determination units 34a2 to 34a6 assigned with the window lengths ts2 to ts6, in which the number of sampled values vi of the single-phase voltage used for calculation processing increases gradually in ascending order of reference numbers, detect the voltage gradual drop in the long time region of up to one hundred and tens of seconds.

The logical sum of voltage gradual drop determination signals j11 to j13 from the voltage gradual drop determination units 34a1 to 34a3 is calculated in a logical sum circuit 45a and the logical sum of voltage gradual drop determination signals J14 to J16 from the voltage gradual drop determination units 34a4 to 34a6 is calculated in a logical sum circuit 45b, and further, the logical sum is calculated in a logical sum circuit 46 and outputted as the voltage gradual drop determination signal j1 from the voltage gradual drop determination unit group 44a.

Here, by setting the voltage change rate set values a1 to a6 so as to become smaller from the region (the window length ts1) having a short determination time of voltage gradual drop in the long time region toward the region (the window length ts6) having a long determination time, it is made possible to detect a large voltage drop rate quickly in the region (the window length ts1) having a short determination time and detect a small voltage drop rate in the region (the window length ts6) having a long determination time. In other words, it is made possible for the voltage gradual drop determination unit group 44a to detect the voltage gradual drop in the long time region in the range from about several seconds to one hundred and tens of seconds and it is unlikely that the detection time of the voltage gradual drop is delayed even if the voltage drop rate increases.

Figure 6:
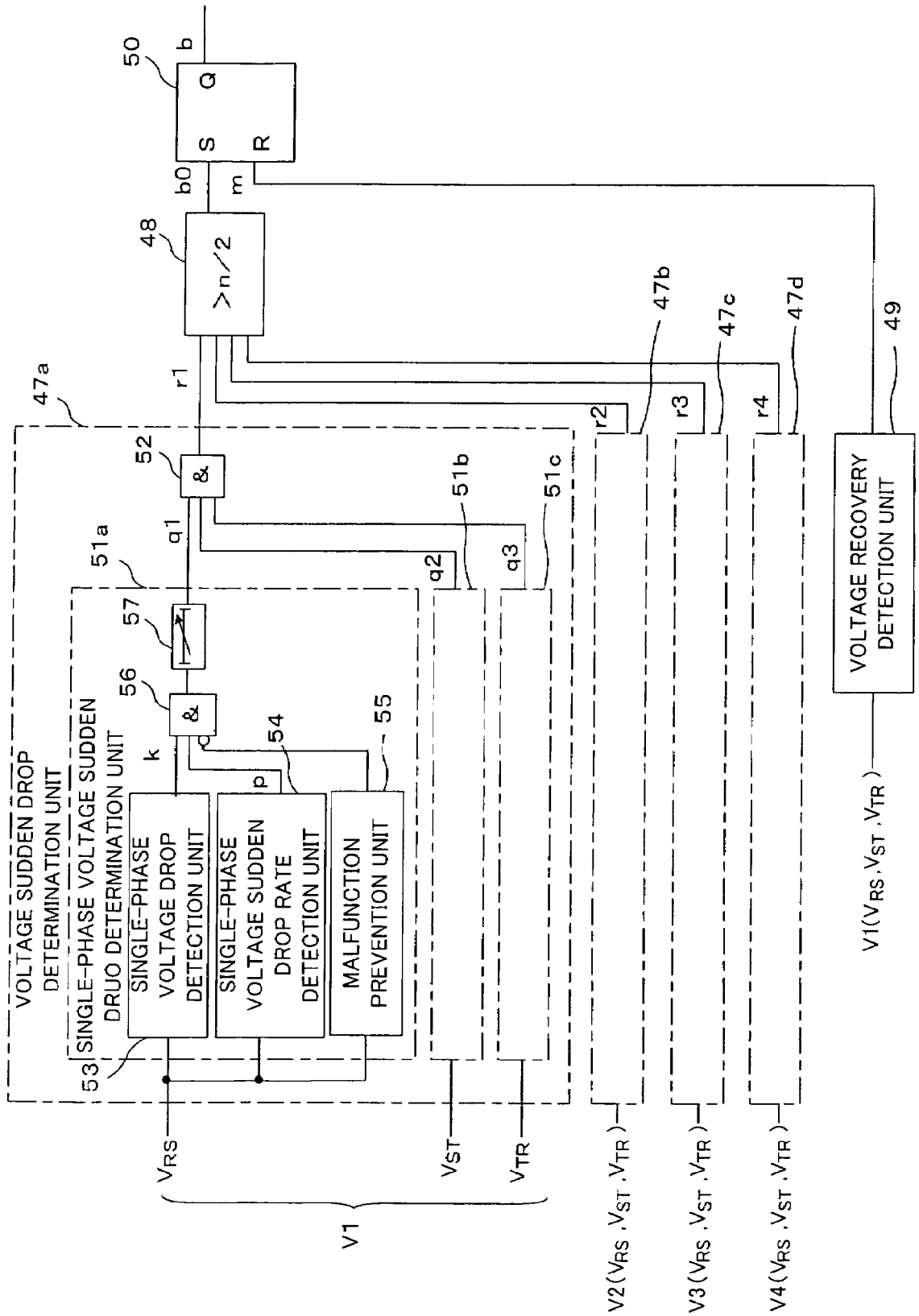
FIG. 6 is a detailed configuration diagram of a system voltage sudden drop determination unit in the first embodiment of the present invention.

Next, the system voltage sudden drop determination unit 28 of the main device 18a is explained below. FIG. 6 is a detailed configuration diagram of the system voltage sudden drop determination unit 28 of the main device 18a. The system voltage sudden drop determination unit 28 comprises a plurality of voltage sudden drop determination units 47a to 47d, a majority decision calculation unit 48, a voltage recovery determination unit 49, and a signal output unit 50.

The respective voltage sudden drop determination units 47a to 47d are provided corresponding to the respective three-phase voltage of power systems V1 to V4 of the upper substation 11a of its own and the other plurality of the upper substations 11b to 11d and determine the voltage sudden drop of the respective three-phase voltage of power systems V1 to V4. The plurality of voltage sudden drop determination units 47a to 47d have the same configuration, therefore, only the voltage sudden drop determination unit 47a is described in detail in FIG. 6 and the details of the voltage sudden drop determination units 47b to 47d are omitted. The voltage sudden drop determination unit 47a is explained below.

The voltage sudden drop determination unit 47a comprises three single-phase voltage sudden drop determination units 51a to 51c and a logical product circuit 52. The single-phase voltage sudden drop determination units 51a to 51c are provided corresponding to the respective single-phase voltages $V_{RS}$, $V_{ST}$, and $V_{TR}$ of the three-phase voltage of power system V1 of the upper substation 11a of its own and determine the voltage sudden drop in the short time region of each phase. The single-phase voltage sudden drop determination units 51a to 51c have the same configuration, therefore, the single-phase voltage sudden drop determination unit 51a is explained.

The single-phase voltage sudden drop determination unit 51a comprises a single-phase voltage drop detection unit 53, a single-phase voltage sudden drop rate detection unit 54, a malfunction prevention unit 55, a logical product circuit 56, and a timer 57, and determines whether or not each single-phase voltage of the three-phase voltage of power system has suddenly dropped.

The single-phase voltage drop detection unit 53 determines whether or not the single-phase voltage $V_{RS}$ of the three-phase voltage of power system V1 drops below a predetermined value and outputs a single-phase voltage drop signal k to the logical product circuit 56 when detecting that the voltage drops below the predetermined value. Further, the single-phase voltage sudden drop rate detection unit 54 detects the voltage drop rate of the single-phase voltage $V_{RS}$ of the three-phase voltage of power system V1 in the short time region of the order of several seconds and outputs a single-phase voltage sudden drop rate detection signal p to the logical product circuit 56 when the voltage drop rate exceeds a predetermined value.

On the other hand, the malfunction prevention unit 55 detects a system failure such as a short circuit fault and a grounding fault, and locks the output of the logical product circuit 56 when detecting a steep change in the voltage drop rate of the single-phase voltage $V_{RS}$ of the system voltage V1. In other words, the voltage drop resulting from a system failure such as a short circuit fault and a grounding fault is steeper than the voltage drop resulting from the reactive power characteristic of the power system, therefore, it is designed such that the malfunction prevention unit 55 detects a system failure and prevents a malfunction of the single-phase voltage sudden drop determination unit 51a by locking the output of the logical product circuit 56 in the event of system failure.

The logical product circuit 56 calculates a logical product of the single-phase voltage drop signal k and the single-phase voltage sudden drop rate detection signal p and outputs an output signal to the timer 57 when both the single-phase voltage drop signal k and the single-phase voltage sudden drop rate detection signal p are established and there is no lock signal from the malfunction prevention unit 55. The timer 57 outputs a single-phase voltage sudden drop determination signal q1 to the logical product circuit 52 when there is no lock signal from the malfunction prevention unit 55 and a state in which both the single-phase voltage drop signal k and the single-phase voltage sudden drop rate detection signal p are established continues for a predetermined period of time.

As described above, the single-phase voltage sudden drop determination unit 51a determines that a voltage sudden drop has occurred in the single-phase voltage $V_{RS}$ of the three-phase voltage of power system V1 when no system failure occurs, the voltage drops below a predetermined value, and the voltage drop rate exceeds a predetermined value, and outputs the single-phase voltage sudden drop determination signal q1. Here, the timer 57 is provided in order to detect without fail the state of voltage sudden drop in the single-phase voltage $V_{RS}$ and to prevent a malfunction caused by the voltage drop due to temporary power variations.

For the other single-phase voltages $V_{ST}$ and $V_{TR}$ of the three-phase voltage of power system V1 similarly, respective single-phase voltage sudden drop determination signals q2 and q3 are outputted from the respective single-phase voltage sudden drop determination units 51b and 51c. These single-phase voltage sudden drop determination signals q1, q2, and q3 are inputted to the logical product circuit 52 of the voltage sudden drop determination unit 47a. Then, when all of the single-phase voltage sudden drop determination signals q1, q2, and q3 are established, the voltage sudden drop determination unit 47a determines that the three-phase voltage of power system V1 in the upper substation 11a of its own has dropped suddenly and outputs a voltage sudden drop determination signal r1.

For the three-phase voltage of power systems V2 to V4 in the other upper substations 11b to 11d similarly, the voltage sudden drop determination units 47b to 47d determine that the three-phase voltage of power systems V2 to V4 in the upper substations 11b to 11 d have dropped suddenly and outputs voltage sudden drop determination signals r2 to r4.

The majority decision calculation unit 48 receives the voltage sudden drop determination signals r1 to r4 from the voltage sudden drop determination units 47a to 47d and outputs a system voltage sudden drop determination signal b0 to the signal output unit 50 based on the majority decision principle. In this case, the majority decision calculation unit 48 performs majority decision calculation of the input signals from the normal devices. For example, failure in the detection system of the system voltages V1 to V4 or in the voltage sudden drop determination units 47a to 47d of the upper substation 11a of its own and the other upper substations 11b to 11d is detected or failure in the transmission system among the main devices 18a to 18d is detected, the voltage sudden drop determination signal r from the defective device is excluded from the majority decision calculation. For example, when all of the devices are normal, if three or more of the four voltage gradual drop determination signals r1 to r4 are established, the system voltage in the power system is determined to have dropped suddenly and the system voltage sudden drop determination signal b0 is outputted to the signal output unit 50. On the other hand, when three of the devices are normal and one of the devices is abnormal, if two or more of the three voltage sudden drop determination units are established, the system voltage in the power system is determined to have dropped suddenly and the system voltage sudden drop determination signal b0 is outputted to the signal output unit 50 as a result. When inputting the system voltage sudden drop determination signal b0, the signal output unit 50 maintains the system voltage sudden drop determination signal b0 and outputs the system voltage sudden drop determination signal b.

On the other hand, the voltage recovery determination unit 49 detects the voltage recovery of the three-phase voltage of power system V1 of the upper substation 11a of its own. Whether or not each single-phase voltage of the three-phase voltage of power system V1 in the upper substation 11a of its own has exceeded a voltage recovery set value determined in advance is determined and it is determined that the voltage is recovered when all of the single-phase voltages exceed the voltage recovery set value, and the voltage recovery signal m is outputted to the signal output unit 50. The voltage recovery set value of the voltage recovery determination unit 49 is set to a value greater than the system voltage when the voltage sudden drop has occurred. This is to secure the recovery from the voltage drop by setting the voltage recovery set value for determining the voltage recovery to a greater value. When the voltage recovery signal m is inputted from the voltage recovery determination unit 49, the signal output unit 50 releases the hold of the system voltage sudden drop determination signal b0 from the majority decision calculation unit 48. Therefore, the outputting of the system voltage sudden drop determination signal b from the signal output unit 50 is terminated.

As described above, the system voltage sudden drop determination unit 28 outputs the system voltage sudden drop determination signal b when the system voltage in the power system has dropped suddenly and terminates the outputting of the system voltage sudden drop determination signal b when the voltage has recovered, therefore, when the voltage sudden drop has occurred, the load is shed and the load shedding is terminated when the voltage sudden drop is recovered.

Figure 7:
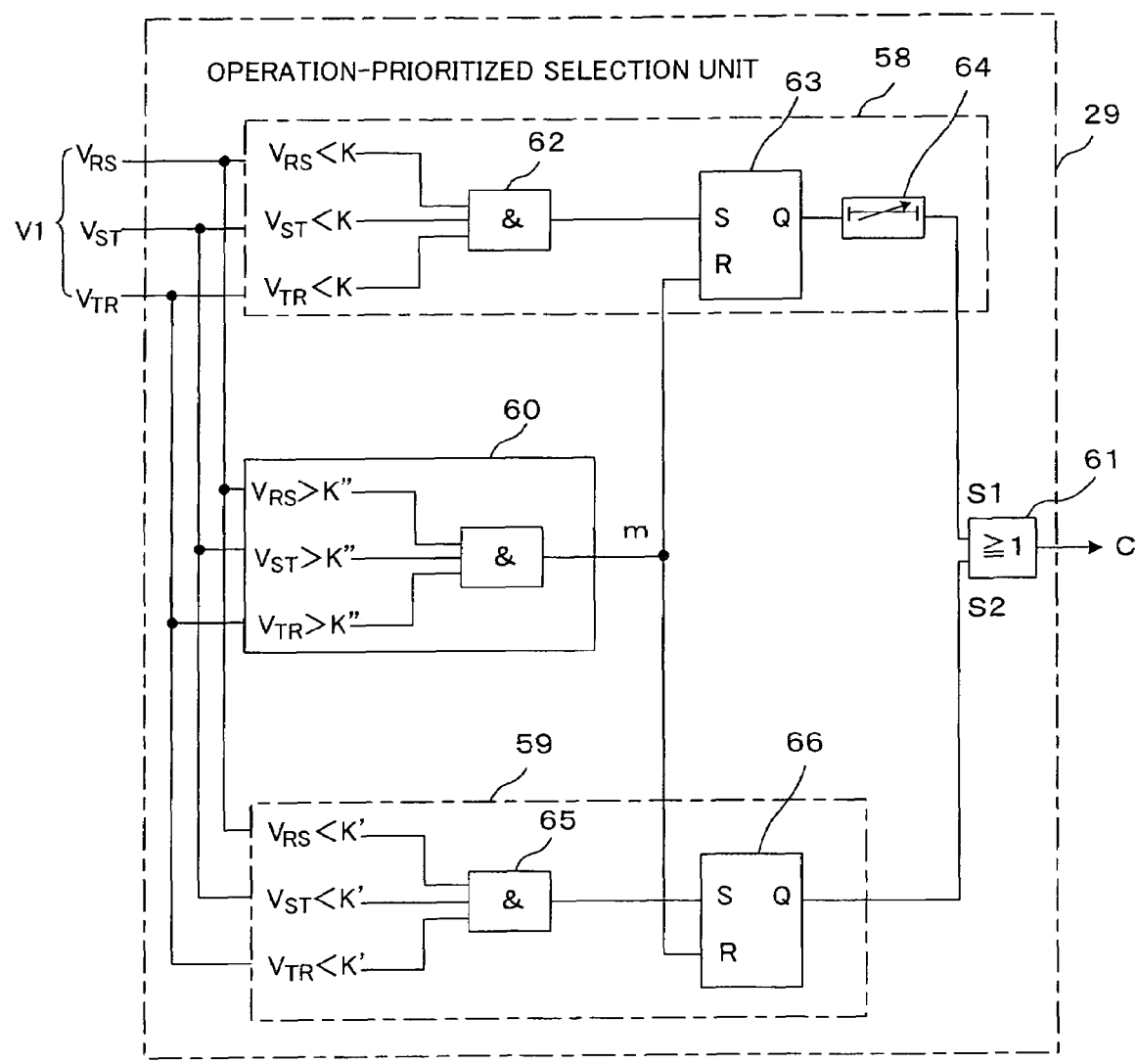
FIG. 7 is a configuration diagram of an operation-prioritized selection unit in the first embodiment of the present invention.

Next, the operation-prioritized selection unit 29 of the main device 18a is explained. FIG. 7 is a configuration diagram of the operation-prioritized selection unit 29. The operation-prioritized selection unit 29 outputs the operation-prioritized selection signal c as to whether or not the system voltage gradual drop determination signal a of the system voltage gradual drop determination unit 27 is outputted with priority based on the three-phase voltage of power system V1 ($V_{RS}$, $V_{ST}$, $V_{TR}$) of the upper substation 11a of its own.

In FIG. 7, the operation-prioritized selection unit 29 comprises a time limit operation unit 58, an instantaneous operation unit 59, a voltage recovery determination unit 60, and a logical sum circuit 61. The time limit operation unit 58 determines whether or not each of the single-phase voltages $V_{RS}$, $V_{ST}$, and $V_{TR}$ of the three-phase voltage of power system V1 of the upper substation 11a of its own drops below a first predetermined value K and outputs the determination signal to a logical product circuit 62. When all of the single-phase voltages $V_{RS}$, $V_{ST}$, and $V_{TR}$ of the three-phase voltage of power system V1 in the upper substation of its own drop below the first predetermined value K, the output signal of the logical product circuit 62 is established and the output signal is inputted to a signal output unit 63. When the output signal of the logical product circuit 62 is inputted, the signal output unit 63 holds and outputs the output signal and when the voltage recovery detection signal m from the voltage recovery determination unit 60 is inputted, releases the hold of the output signal of the logical product circuit 62. The output signal of the signal output unit 63 is inputted to a timer 64 and after a lapse of a predetermined period of time, is outputted to the logical sum circuit 61 as a first detection signal s1.

On the other hand, the instantaneous operation unit 59 has a second predetermined value K' smaller than the first predetermined value K of the time limit operation unit 58. Then, the instantaneous operation unit 59 determines whether or not each of the single-phase voltages $V_{RS}$, $V_{ST}$, and $V_{TR}$ of the three-phase voltage of power system V1 of the upper substation 11a of its own drops below the second predetermined value K' and outputs the determination signal to a logical product circuit 65. When all of the single-phase voltages $V_{RS}$, $V_{ST}$, and $V_{TR}$ of the three-phase voltage of power system V1 in the upper substation of its own drop below the second predetermined value K', the output signal of a logical product circuit 65 is established and the output signal is inputted to a signal output unit 66. When the output signal of the logical product circuit 65 is inputted, the signal output unit 66 holds and outputs the output signal and when the voltage recovery detection signal m from the voltage recovery determination unit 60 is inputted, releases the hold of the output signal of the logical product circuit 65. The output signal of the signal output unit 66 is outputted to the logical sum circuit 61 as a second detection signal s2.

The voltage recovery determination unit 60 detects the voltage recovery of the three-phase voltage of power system V1 of the upper substation 11a of its own. Whether or not each of the single-phase voltages $V_{RS}$, $V_{ST}$, and $V_{TR}$ of the three-phase voltage of power system V1 in the upper substation 11a of its own has exceeded a third predetermined value K" is determined and it is determined that the voltage is recovered when all of the single-phase voltages $V_{RS}$, $V_{ST}$, and $V_{TR}$ exceed the predetermined value, and the voltage recovery signal m is outputted to the signal output units 63 and 66. The third predetermined value K" of the voltage recovery determination unit 60 is set to a value greater than the first predetermined value K of the time limit operation unit 58. This is to secure the recovery from the voltage drop by setting the predetermined value for judging the voltage recovery to a greater value. When the voltage recovery signal m is inputted from the voltage recovery determination unit 60, the signal output units 63 and 66 release the hold of the first detection signal s1 and the second detection signal s2 and terminates the outputting of the operation-prioritized selection signal c.

When inputting either of the first detection signal s1 and the second detection signal s2, the logical sum circuit 61 outputs the operation-prioritized selection signal c. Therefore, the operation-prioritized selection unit 29 outputs the operation-prioritized selection signal c by the time limit operation when the voltage drop of the system voltage V1 is comparatively small, that is, less than the first predetermined value K and outputs the operation-prioritized selection signal c by the instantaneous operation when the voltage drop of the system voltage V1 is comparatively large, that is, less than the second predetermined value K'.

Figure 8:
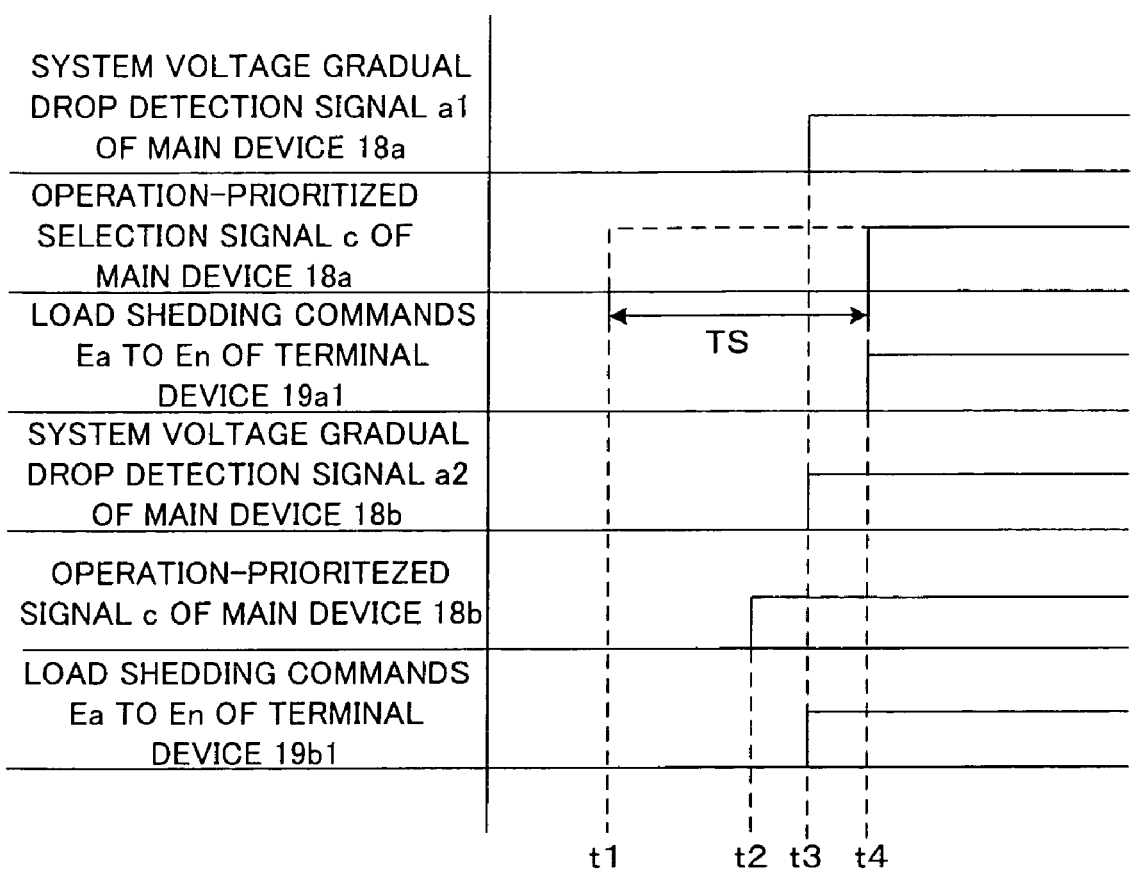
FIG. 8 is a time chart showing the operation of the operation-prioritized selection unit in the first embodiment of the present invention.

Next, the operation of the operation-prioritized selection unit 29 is explained. FIG. 8 is a time chart showing the operation of the operation-prioritized selection unit 29. Here, it is assumed that the system voltage V1 of the upper substation 11a of its own drops below the first predetermined value K at a point in time t1 and the system voltage V2 of other upper substation 11b drops below the second predetermined value K' at a point in time t2.

When the system voltage V1 of the upper substation 11a of its own drops below the first predetermined value K at the point in time t1, the operation-prioritized selection unit 29 of the main device 18a detects the fact by the time limit operation unit 58 but outputs the operation-prioritized selection signal c to the terminal device 19a1 at a point in time t4, delayed by a time period Ts of the timer 64. On the other hand, when the system voltage V2 of the other upper substation 11a drops below the second predetermined value K' at the point in time t2, the operation-prioritized selection unit 29 of the main device 18b detects the fact by the instantaneous operation unit 59 and instantaneously outputs the operation-prioritized selection signal c to the terminal device 19b1 at the point in time t2.

Then, at a point in time t3, when detecting the voltage gradual drop, respectively, the system voltage gradual drop determination unit 27 of the main device 18a in the upper substation 11a of its own and the system voltage gradual drop determination unit 27 of the main device 18b in the other upper substation 11b output system voltage gradual drop determination signal a1 and system voltage gradual drop determination signal a2, respectively. At the point in time t3, the system voltage gradual drop determination signal a1 is outputted but the operation-prioritized selection signal c of the operation-prioritized selection unit 29 of the main device 18a is not outputted, therefore, the condition for the terminal device 19a1 to output the load shedding commands Ea to En is not established. When the system voltage gradual drop determination signal a2 is outputted, since the operation-prioritized selection signal c of the operation-prioritized selection unit 29 of the main device 18b has already been outputted, therefore, the terminal device 19b1 outputs the load shedding commands Ea to Em as a result.

Then, at the point in time t4, when the operation-prioritized selection signal c of the operation-prioritized selection unit 29 of the main device 18a is outputted, the system voltage gradual drop determination signal 27 of the main device 18a has already outputted the system voltage gradual drop determination signal a1 at the point in time t3, therefore, the condition for the terminal device 19a1 to output the load shedding commands Ea to En is partially established.

As described above, the operation-prioritized selection unit 29 outputs the operation-prioritized selection signal c by the time limit operation when the voltage drop of the upper substation 11a of its own is comparatively small and outputs the operation-prioritized selection signal c by the instantaneous operation when the voltage drop is comparatively large. In other words, the operation-prioritized selection unit 29 outputs the operation-prioritized selection signal c to the terminal devices 19a1 to 19d3 for performing load shedding with priority of the loads of the lower substations 15a to 15d connected to the upper substations 11a to 11d in which the voltage drop in the system voltages V1 to V4 is large. In the above explanation, the case where one time limit operation unit 58 is provided is explained, however, it may also be possible to provide a plurality of time limit operation units 58.

Figure 9:
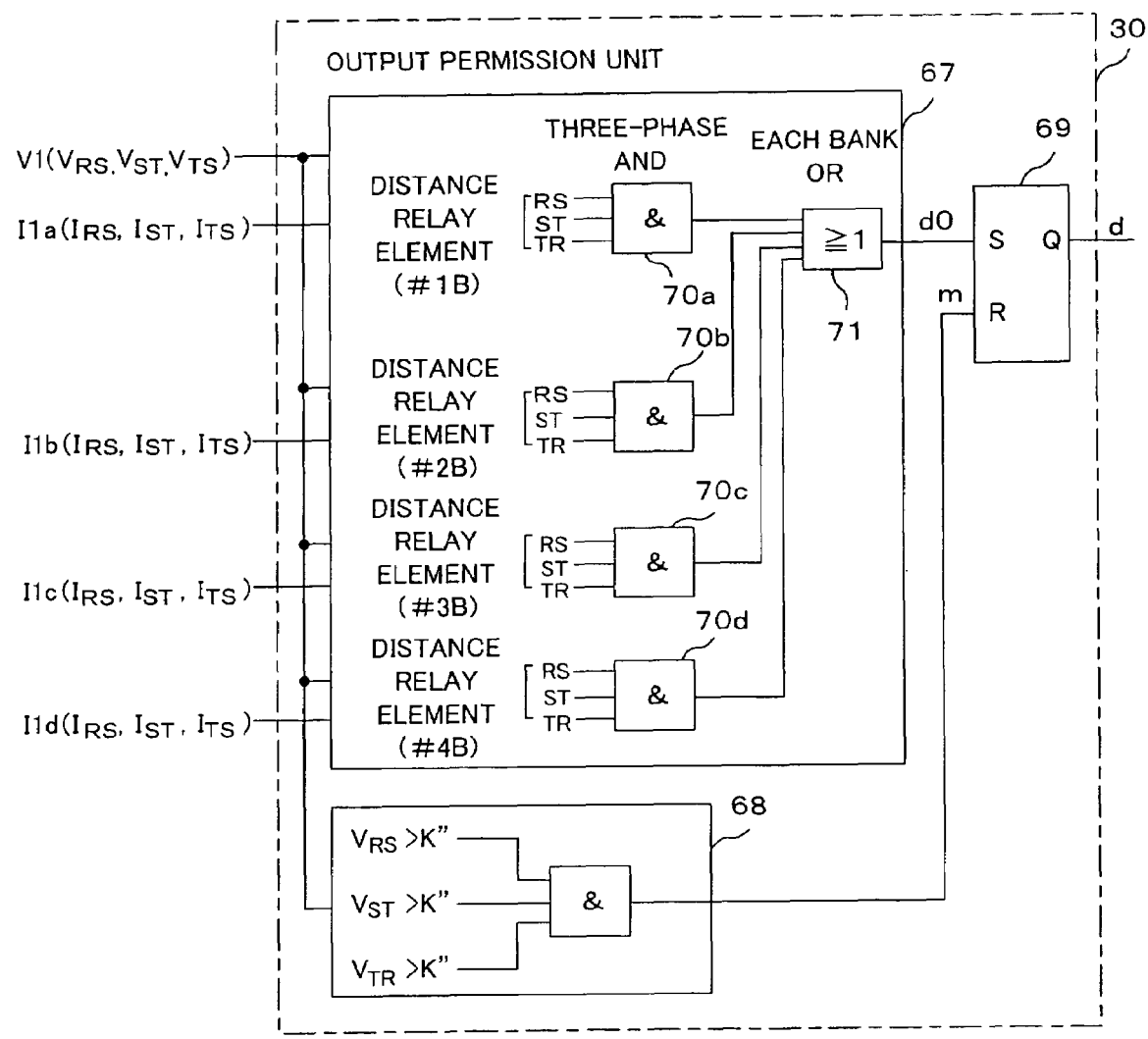
FIG. 9 is a configuration diagram of an output permission unit in the first embodiment of the present invention.

Next, the output permission unit 30 of the main device 18a is explained. FIG. 9 is a configuration diagram of the output permission unit 30. The output permission unit 30 comprises a load selection unit 67, a voltage recovery determination unit 68, and a signal output unit 69.

The load selection unit 67 receives the V1 ($V_{RS}$, $V_{ST}$, $V_{TR}$) of the upper substation 11a of its own and respective three-phase system currents I1a ($I_{RS}$, $I_{ST}$, $I_{TR}$), I1b ($I_{RS}$, $I_{ST}$, $I_{TR}$), I1c ($I_{RS}$, $I_{ST}$, $I_{TR}$), and I1d ($I_{RS}$, $I_{ST}$, $I_{TR}$) of the respective plurality of transformers in the upper substation 11a of its own and determines whether or not the voltage sudden drop results from the reactive power characteristic for each single-phase based on the three-phase voltage of power system V1 and the system currents 11a to 11d in the upper substation 11a of its own.

This is to prevent a malfunction due to voltage sudden drop other than the voltage sudden drop resulting from the reactive power characteristic. For example, there is the case where voltage drop continues for a long time if load shedding fails in the event of system failure and this is to identify the voltage sudden drop phenomenon in such a case.

Figure 10:
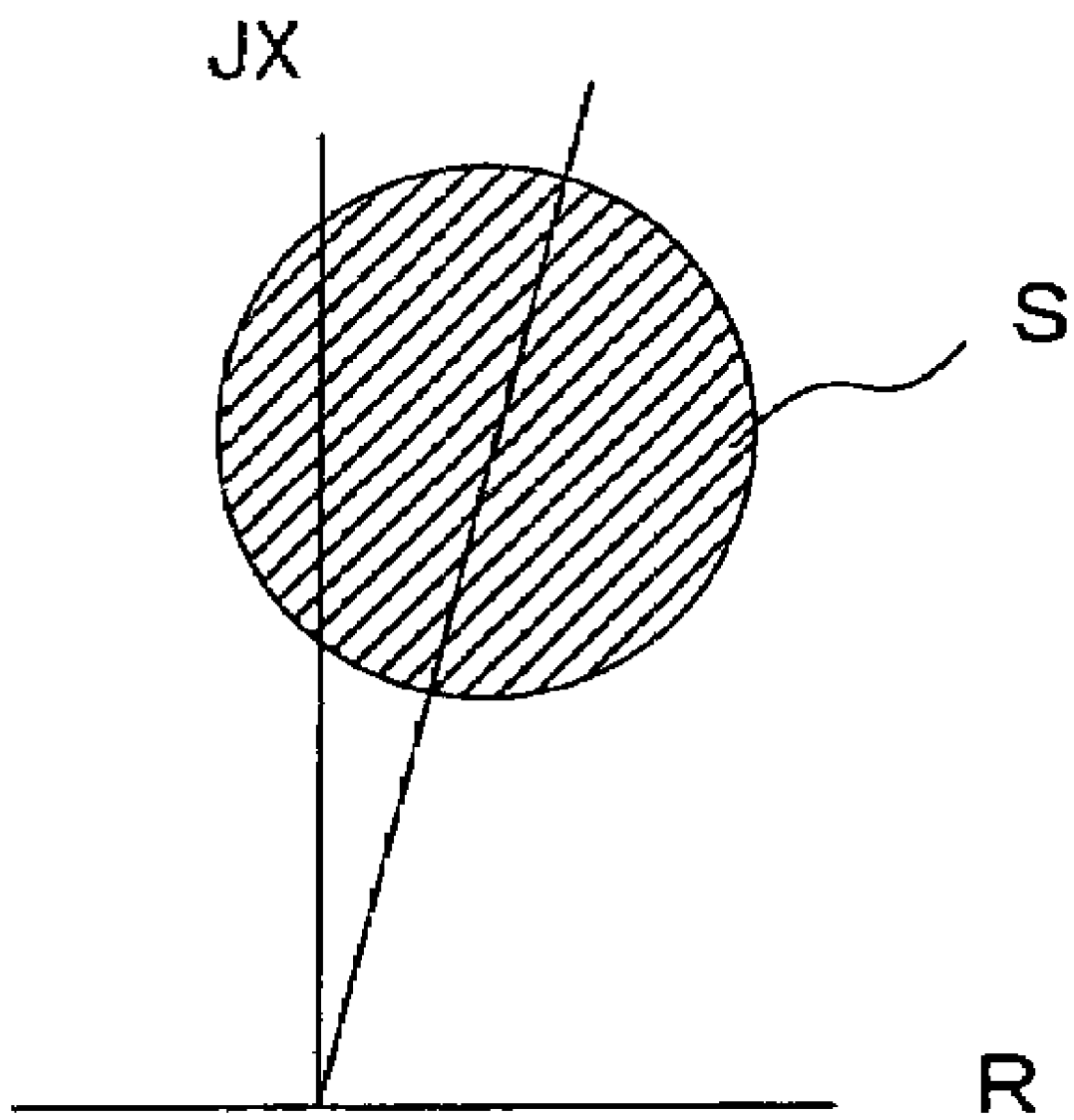
FIG. 10 is an operation range characteristic diagram of a distance relay element of a load selection unit in the first embodiment of the present invention.

In the event of the voltage sudden drop resulting from the reactive power characteristic, the characteristic that the reactive power of load steeply increases is paid attention to and each of the system voltages V1 to V4 and the system bus currents I1 to I4 is caused to have an offset mho type distance relay element shown in FIG. 10 and whether or not the characteristic ($Z=V_{RS}/I_{RS}$, $Z=V_{ST}/I_{ST}$, $Z=V_{TR}/I_{TR}$) of each single-phase of the system voltages V1 to V4 and the system bus currents I1 to I4 has entered an operation range S of the distance relay element is judged.

In other words, a logical product circuit 70a of the load selection unit 67 outputs an output signal when the characteristics of all the single-phases of the three-phase voltage of power system V1 and the system current I1a of the upper substation 11a enter the operation range S. Similarly, a logical product circuit 70b outputs an output signal when the characteristics of all the single-phases of the three-phase voltage of power system V1 and the system current I1b of the upper substation 11a enter the operation range S, a logical product circuit 70c outputs an output signal when the characteristics of all the single-phases of the three-phase voltage of power system V1 and the system current I1c of the upper substation 11a enter the operation range S, and a logical product circuit 70d outputs an output signal when the characteristics of all the single-phases of the three-phase voltage of power system V1 and the system current I1d of the upper substation 11a enter the operation range S.

Then, each output signal of the logical product circuits 70a to 70d is inputted to a logical sum circuit 71 and when any of the output signals is established, an output permission signal d0 is outputted from the logical sum circuit 71. Therefore, in the upper substation 11a, when the occurrence of a voltage sudden drop phenomenon resulting from the reactive power characteristic is taking place, the output permission signal d0 is outputted to the signal output unit 69 from the load selection unit 67. When the output permission signal d0 is inputted from the load selection unit 67, the signal output unit 69 holds the output permission signal d0 and outputs the output permission signal d, and when the voltage recovery detection signal m is inputted from the voltage recovery determination unit 68, the signal output unit 69 releases the hold of the output permission signal d0 from the load selection unit 67.

In addition, the voltage recovery determination unit 68 detects the voltage recovery of the three-phase voltage of power system V1 of the upper substation 11a of its own and whether or not each single-phase voltage $V_{RS}$, $V_{ST}$, and $V_{TR}$ of the three-phase voltage of power system V1 in the upper substation 11a of its own has exceeded the predetermined value K" is determined and it is determined that the voltage is recovered when all of the single-phase voltages $V_{RS}$, $V_{ST}$, and $V_{TR}$ exceed the predetermined value, and the voltage recovery signal m is outputted to the signal output unit 69. When the voltage recovery signal m is inputted from the voltage recovery determination unit 68, the signal output unit 69 releases the hold of the output permission signal d0. By the way, the predetermined value K" of the voltage recovery determination unit 68 is set to the same value as the predetermined value K" of the voltage recovery determination unit 60 of the operation-prioritized selection unit 29.

As described above, the output permission unit 30 determines whether or not the voltage sudden drop results from the reactive power characteristic based on the system voltage V1 and the system bus currents I1 to I4 of the upper substation 11a of its own and outputs the output permission signal d when the voltage sudden drop results from the reactive power characteristic. Further, the output permission unit 30 terminates the outputting of the output permission signal d when the voltage of the system voltage of the upper substation 11a of its own is recovered. Therefore, it is possible to prevent a malfunction due to voltage sudden drop other than the voltage sudden drop resulting from the reactive power characteristic.

Figure 11:
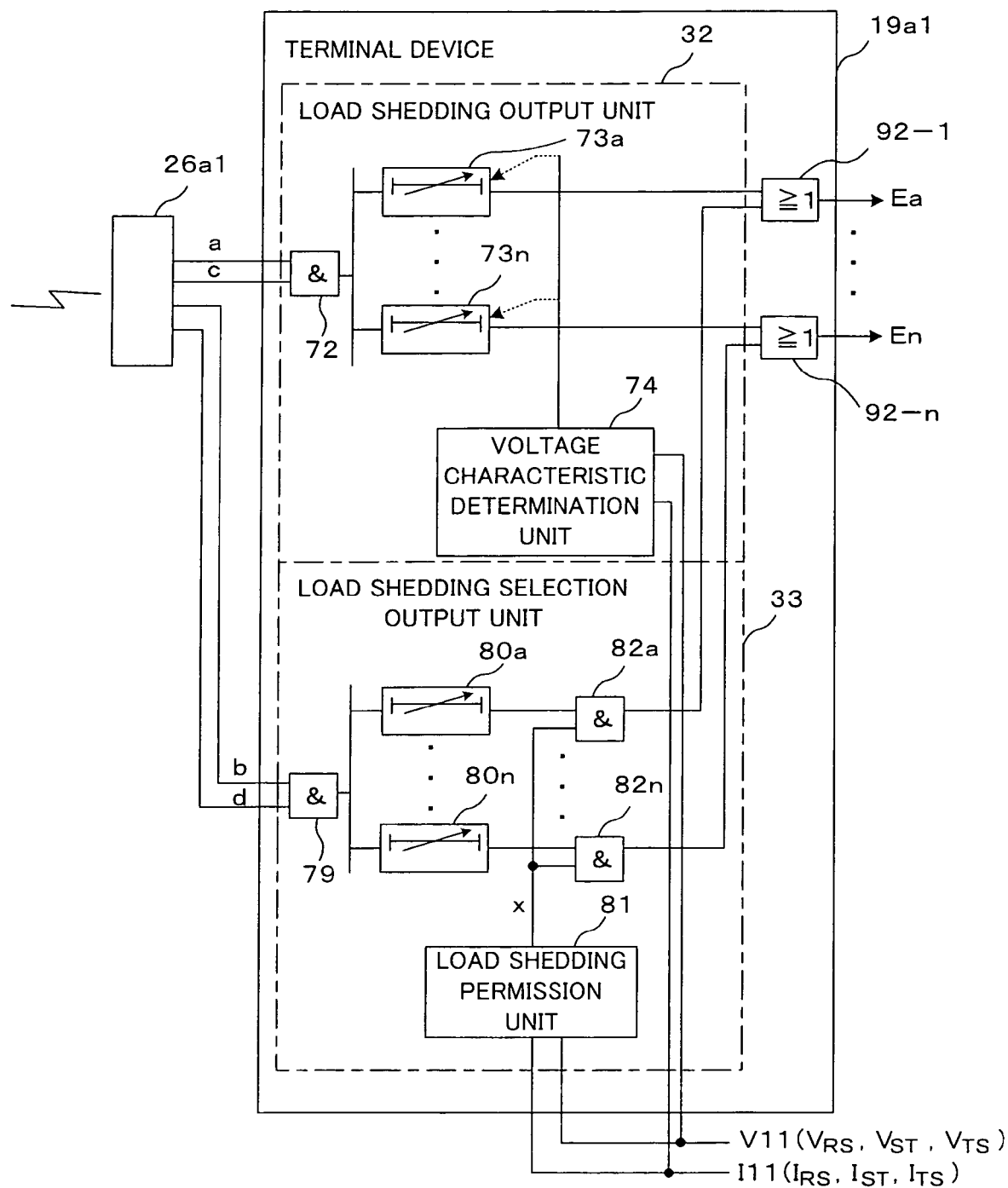
FIG. 11 is a configuration diagram of a terminal device in the first embodiment of the present invention.

Next, the terminal device 19 is explained. The respective terminal devices 19a1 to 19d3 have the same configuration, therefore, the terminal device 19a1 is explained. FIG. 11 is a configuration diagram of the terminal device 19a1. The terminal device 19a1 comprises the load shedding output unit 32 and the load shedding selection output unit 33.

The load shedding output unit 32 is provided corresponding to the system voltage gradual drop determination unit 27 and the operation-prioritized selection unit 29 of the main device 18a, comprising a logical product circuit 72, a plurality of timer devices 73a to 73n, and a voltage characteristic determination unit 74. The system voltage gradual drop determination signal a from the system voltage gradual drop determination unit 27 of the main device 18a and the operation-prioritized selection signal c from the operation-prioritized selection unit 29 are inputted to the logical product circuit 72 via the signal terminal station device 26a1. When receiving both the system voltage gradual drop determination signal a and the operation-prioritized selection signal c, the logical product circuit 72 outputs the load shedding commands Ea to En for the loads of the respective feeders 17 connected to the load bus 16 of the lower substation 15a1 through the timer devices 73a to 73n. As will be described later, the timer devices 73a to 73n are configured so as to be capable of variably setting a time period.

The voltage characteristic determination unit 74 receives the three-phase load voltage V11 ($V_{RS}$, $V_{ST}$, $V_{TR}$) and the three-phase load current I11 ($I_{RS}$, $I_{ST}$, $I_{TR}$) of the load bus 16 of the lower substation 15a1 and determines to which region the load voltage V11 belongs in the predetermined range determined in advance with the load power factor $\cos\theta$ being added, and sets the time periods of the timer devices 73a to 73n so that the time periods of the timer devices 73a to 73n are those corresponding to the region to which the load voltage V11 belongs. Due to this, the load shedding commands Ea to En are sequentially outputted in the order specified by the time period operation in accordance with the time period of the timer devices 73a to 73n.

Figure 12:
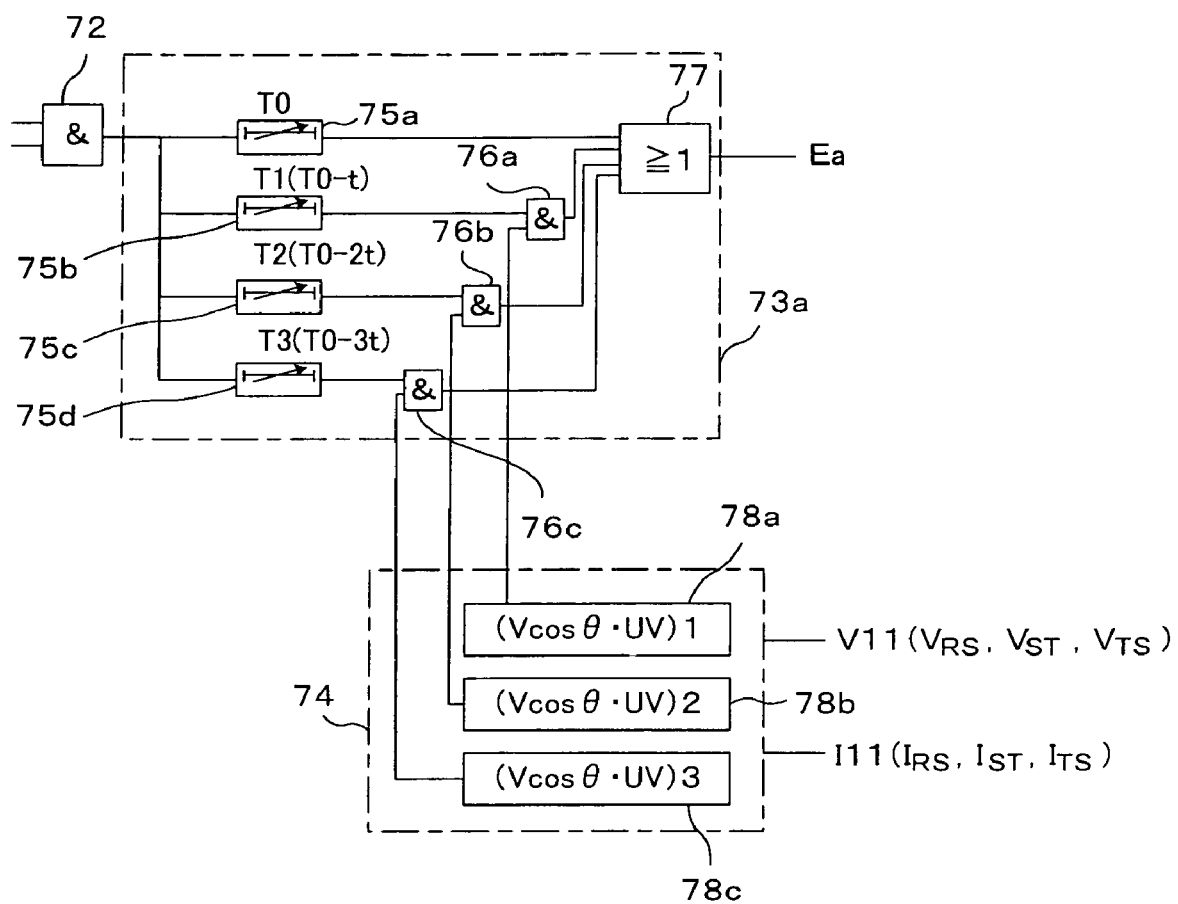
FIG. 12 is a configuration diagram of a voltage characteristic determination unit and a timer device in the first embodiment of the present invention when the voltage characteristic determination unit sets a time period of the timer device.

FIG. 12 is a configuration diagram of the voltage characteristic determination unit 74 and the timer device 73a when the voltage characteristic determination unit 74 sets the time period of the timer device 73a. The timer device 73a has a plurality of timers 75a to 75d having different time periods and for time period T0 of the timer 75a, it is determined that the timer 75b has time period T1 (T1=T0−t), the timer 75c has time period T2 (T2=T0−2t), and the timer 75d has time period T3 (T1=T0−3t) and the time period T0 of the timer 75a is set to be longest and the time period T3 of the timer 75d is set to be shortest. Then, the respective output signals of the timers 75b to 75d are inputted to respective logical product circuits 76a to 76c and when the permission signal from the voltage characteristic determination unit 74 is inputted to the logical product circuits 76a to 76c, the output signals of the timers 75b to 75d are outputted to a logical sum circuit 77. To the logical sum circuit 77, the output signal of the timer 75 is also inputted and when any of the output signals of the respective timers 75a to 75d is inputted, the signal is outputted as the load shedding command Ea.

The voltage characteristic determination unit 74 comprises a plurality of load voltage characteristic determination units 78a to 78c and each of the load voltage characteristic determination units 78a to 78c has a voltage characteristic range determined with a load power factor $\cos\theta$ determined in advance being added. Each of the load voltage characteristic determination units 78a to 78c inputs the three-phase load voltage V11 ($V_{RS}$, $V_{ST}$, $V_{TR}$) and the three-phase load current I11 ($I_{RS}$, $I_{ST}$, $I_{TR}$) of the load bus 16 of the lower substation 15a1, and operates when the load voltage V11 with reference to the load current I11 enters the determined voltage characteristic range and outputs a permission signal to the logical product circuits 76a to 76c.

Figure 13:
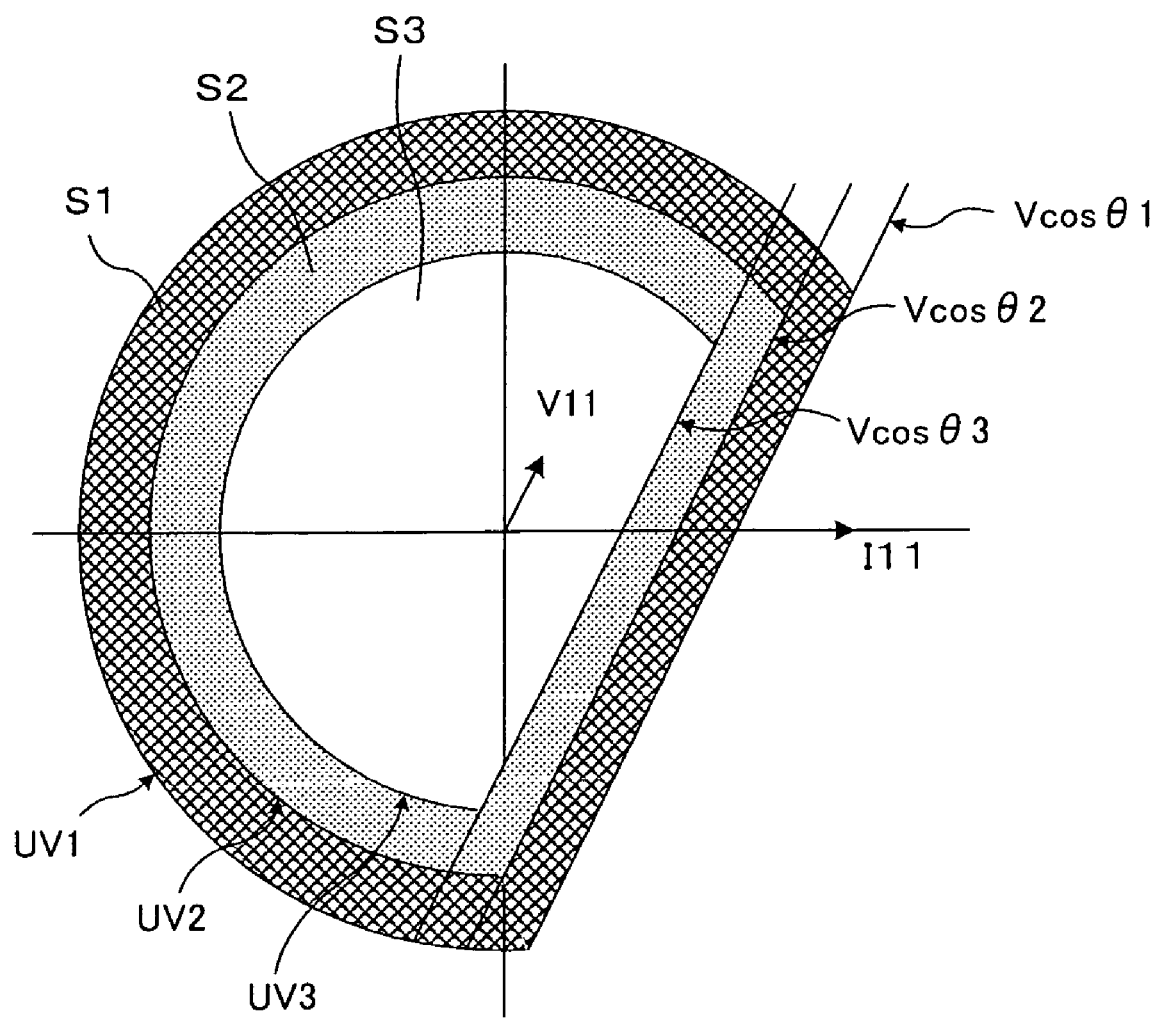
FIG. 13 is a voltage vector plane view of a voltage characteristic range with reference to the phase of a current vector that a load voltage characteristic determination unit of a voltage characteristic determination unit has in the first embodiment of the present invention.

FIG. 13 is a voltage vector plane view of the voltage characteristic range where the current vector of the load current I11 supplied to the load voltage characteristic determination units 78a to 78c is used as the phase reference. Respective voltage characteristic ranges S1 to S3 have respective set values UV1 to UV3 set in advance with respect to the load voltage V11 and set values Vcosθ1 to Vcosθ3 set in advance with respect to the load power factor cosθ and the respective regions are determined by these set values. As described above, each of the voltage characteristic ranges S1 to S3 is a predetermined region to which the load power factor cosθ has been added. In other words, in the voltage characteristic ranges S1 to S3, when the load power factor cosθ is large, for example, the load power factor cosθ is "1" (when the load voltage V11 and the load current I11 are in phase), the characteristic is such that the voltage characteristic ranges S1 to S3 are hard to enter even if the absolute value of the load voltage V11 is small.

The load voltage characteristic determination unit 78a has the voltage characteristic range S1 in which operation is effected when the load voltage V11 and the load power factor are comparatively large and is designed so as to output a permission signal to the timer 75b having the longest time period of the timer device 73a. Similarly, the load voltage characteristic determination unit 78b has the voltage characteristic range S2 in which operation is effected when the load voltage V11 and the load power factor are rather small and is designed so as to output a permission signal to the timer 75c having the intermediate time period of the timer device 73a. Further, the load voltage characteristic determination unit 78c has the voltage characteristic range S3 in which operation is effected when the load voltage V11 and the load power factor are small and is designed so as to output a permission signal to the timer 75d having the shortest time period of the timer device 73a. When the load voltage V11 does not belong to any of the voltage characteristic ranges S1 to S3, the output signal from the timer 75a of the timer device 73a is selected by the logical sum circuit 77.

As described above, the load shedding output unit 32 is configured so as to output the load shedding command earlier when the load voltage V11 of the lower substation and the load power factor cosθ are smaller by shortening the time limit operation. Therefore, it is possible to perform load shedding with priority given to loads suffering more from the influence of the voltage drop. In the above explanation, the load shedding command is outputted earlier when the load voltage V11 and the load power factor cosθ are smaller by shortening the time limit operation, however, it may also be possible for the load shedding command to be outputted earlier when either of the load voltage V11 and the load power factor cosθ is smaller.

Next, the load shedding selection output unit 33 of the terminal device 19a1 is explained. In FIG. 11, the load shedding selection output unit 33 is provided corresponding to the system voltage sudden drop determination unit 28 and the output permission unit 30 of the main device 18a, comprising a logical product circuit 79, a plurality of timers 80a to 80n, a load shedding permission unit 81, and a plurality of logical product circuits 82a to 82n.

The system voltage sudden drop determination signal b from the system voltage sudden drop determination unit 28 of the main device 18a and the output permission signal d from the output permission unit 30 are inputted to the logical product circuit 79 via the signal terminal station device 26a1. When receiving both the system voltage sudden drop determination signal b and the output permission signal d, the logical product circuit 79 outputs the load shedding commands Ea to En for the load of the respective feeders 17 connected to the load bus 16 of the lower substation 15a1 via the timers 82a to 82 n, the logical product circuits 82a to 82n, and the logical sum circuits 92-1 to 92-n.

The timers 80a to 80n determine the order to output the load shedding commands Ea to En and, for example, the time period of the timer 80a is set to be shortest and the time periods in the increasing order are sequentially set to the timers 80a to 80n. Therefore, the time period of the timer 80n is set to be longest. Due to this, the output signals of the timers 80a to 80n are outputted to the logical product circuits 82a to 80n in the order from the timer 80a to the timer 80n. When a permission signal x is inputted from the load shedding permission unit 81, the logical product circuits 82a to 82n output the output signals of the timers 80a to 80n. Therefore, when the permission signal x is inputted to the logical product circuits 82a to 82n from the load shedding permission unit 81, the load shedding commands are outputted sequentially in the order specified by the time periods of the timers 80a to 80n.

Figure 14:
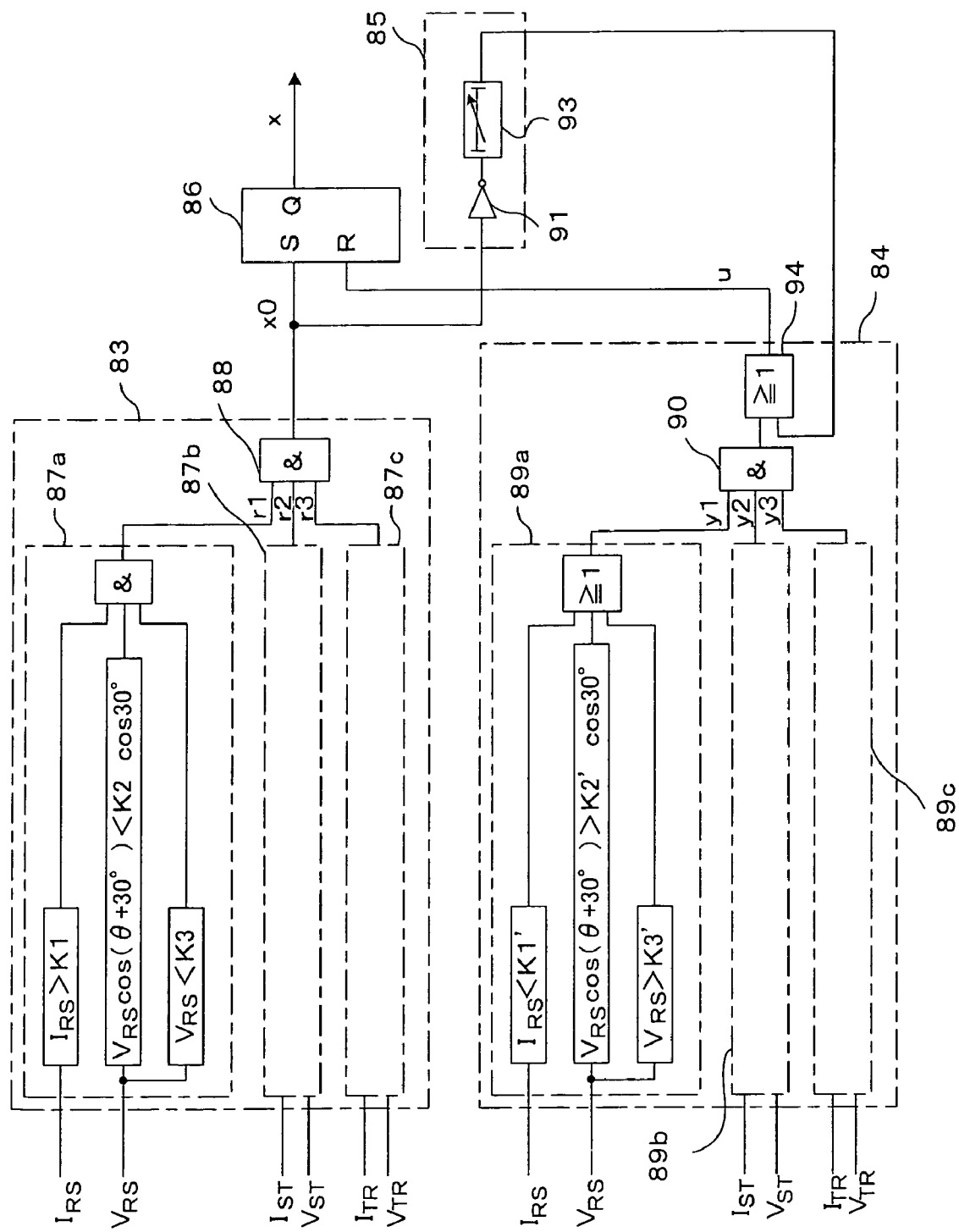
FIG. 14 is a configuration diagram of a load shedding permission unit in the first embodiment of the present invention.

FIG. 14 is a configuration diagram of the load shedding permission unit 81. The load shedding permission unit 81 comprises an operation determination unit 83, a recovery determination unit 84, an operation reset unit 85, and a signal output unit 86.

The operation determination unit 83 determines whether the voltage current characteristic of the load bus is in the state of the voltage drop resulting from the reactive power characteristic and outputs a permission signal x0 when the voltage current characteristic is in the state of the voltage drop. The operation determination unit 83 receives the three-phase load voltage V11 ($V_{RS}$, $V_{ST}$, $V_{TR}$) and the three-phase load current I11 ($I_{RS}$, $I_{ST}$, $I_{TR}$) and determines for each single-phase whether the voltage current characteristic of the load bus is in the state of the voltage drop resulting from the reactive power characteristic by single-phase operation determination units 87a to 87c. Since the single-phase operation determination units 87a to 87c have the same configuration, only the configuration of the single-phase operation determination unit 87a is shown in FIG. 14. The single-phase operation determination unit 87a is explained below.

When the single-phase load current $I_{RS}$ exceeds a predetermined value K1, the single-phase load voltage $V_{RS}$ is less than a predetermined value K3, and a relation determined by the single-phase load voltage $V_{RS}$ and the load power factor cosθ is less than a predetermined value ($V_{RS}$ cos(θ+30°)<K2 cos30°), the single-phase operation determination unit 87a determines that the single-phase RS phase is in the state of voltage drop resulting from the reactive power characteristic and outputs the determination signal r1. Similarly, for the ST phase and the TS phase, the determination signals r2 and r3 are outputted by the single-phase operation determination units 87b and 87c. The determination signals r1, r2, and r3 are inputted to a logical product circuit 88 of the operation determination unit 83 and when all of the determination signals r1, r2, and r3 are established, the permission signal x0 is outputted to the signal output unit 86 from the operation determination unit 83.

When the permission signal x0 is inputted from the operation determination unit 83, the signal output unit 86 holds the permission signal x0 and outputs the permission signal x, and when a recovery signal u from the recovery determination unit 84 is inputted, the signal output unit 86 releases the hold of the permission signal x0. Therefore, when the permission signal x0 is inputted from the operation determination unit 83, the signal output unit 86 outputs the permission signal x to the logical product circuits 82a to 82n of the load shedding selection output unit 33 provided the recovery signal u is not inputted from the recovery determination unit 84. By the outputting of the permission signal x, the outputting of the load shedding commands Ea to En from the load shedding selection output unit 33 are permitted and the load shedding commands Ea to En are sequentially outputted in the order specified by the timers 80a to 80n.

The recovery determination unit 84 determines whether the voltage current characteristic of the load bus is recovered from the state of the voltage drop resulting from the reactive power characteristic is determined and outputs the recovery signal u when the characteristic is recovered. The recovery determination unit 84 receives the three-phase load voltage V11 ($V_{RS}$, $V_{ST}$, $V_{TR}$) and the three-phase load current I11 ($I_{RS}$, $I_{ST}$, $I_{TR}$) and determines for each single-phase whether the voltage current characteristic of the load bus is recovered from the state of the voltage drop resulting from the reactive power characteristic by single-phase recovery determination units 89a to 89c. Since the single-phase recovery determination units 89a to 89c have the same configuration, only the configuration of the single-phase recovery determination unit 89a is shown in FIG. 14. The single-phase recovery determination unit 89a is explained below.

When the single-phase load current $I_{RS}$ drops below a predetermined value K1', the single-phase load voltage $V_{RS}$ exceeds a predetermined value K3', or a relation determined by the single-phase load voltage $V_{RS}$ and the load power factor cosθ is less than a predetermined value ($V_{RS}$ cos(θ+ 30°)<K2 cos30°), the single-phase recovery determination unit 89a judges that the single-phase RS phase recovers from the state of voltage drop resulting from the reactive power characteristic and outputs a determination signal y1.

Similarly, also for the ST phase and the TS phase, determination signals y2 and y3 are outputted from the single-phase recovery determination units 89b and 89c. The determination signals y1, y2, and y3 are inputted to a logical product circuit 90 of the recovery determination unit 84 and when all of the determination signals y1, y2, and y3 are established, the recovery signal u is outputted to the signal output unit 86. When the recovery signal u is inputted from the recovery determination unit 84, the hold of the permission signal x is released. Due to this, the outputting of the load shedding commands Ea to En from the load shedding selection output unit 33 is terminated and the load shedding operation stops.

Figure 15:
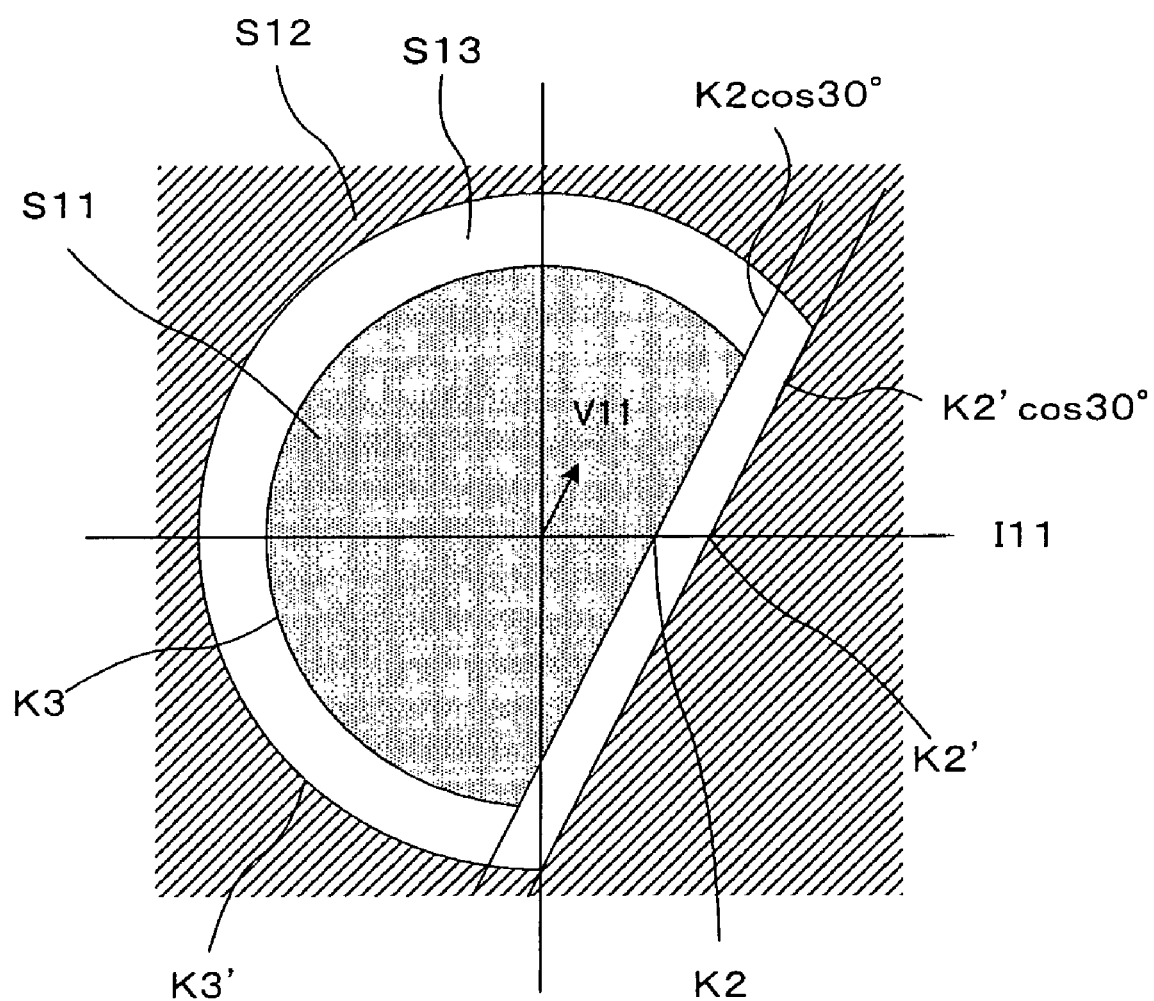
FIG. 15 is a voltage vector plane view with reference to the phase of a current vector indicating an operation condition range of a single-phase operation determination unit and a recovery condition range of a single-phase recovery determination unit in the first embodiment of the present invention.

FIG. 15 is a voltage vector plane view in which the current vector of the load current I11 indicating an operation condition range of the single-phase operation determination unit 87a and a recovery condition range of the single-phase recovery determination unit 89a is used as the phase reference. The set values K3 to K3' determined in advance for the load voltage V11 and the set values K2 cos 30° to K2' cos 30° set in advance for the load power factor cosθ are possessed and an operation condition range S11 and a recovery condition range S12 are determined by these set values. A dead zone range S13 is provided between the operation condition range S11 and the recovery condition range S12. When the load voltage v11 with reference to the load current I11 enters the operation condition range S11, the single-phase operation determination unit 87a operates and when entering the recovery condition range S12, the single-phase recovery determination unit 89a operates.

In other words, in the operation condition range S11 and the recovery condition range 512, when the load power factor cosθ is large, for example, the load power factor cosθ is "1" (the load voltage V11 and the load current I11 are in phase), the characteristic is such that the operation condition range S11 is hard to enter even if the absolute value of the load voltage V11 is small and the recovery condition range S12 is easy to enter even if the absolute value of the load voltage V11 is comparatively small. In the above explanation, by taking into consideration the load voltage V11 and the load power factor cosθ, the set value is determined and the operation condition range S1 and the recovery condition range S12 are determined, however, it may also be possible to determine the set value based on either of the load voltage V11 and the load power factor cosθ and then determine the operation condition range S11 and the voltage gradual drop S12.

The operation reset unit 85 releases the hold of the permission signal x0 of the signal output unit 86 after a lapse of a predetermined time period when the operation of the operation determination unit 83 is recovered and the permission signal x0 from the operation determination unit 83 is outputted no longer. The operation reset unit 85 comprises a NOT circuit 91 and a timer 93. The permission signal x0 from the operation determination unit 83 is inputted to the timer 93 via the NOT circuit 91 and the timer 93 releases the hold of the permission signal x0 of the signal output unit 86 via a logical sum circuit 94 of the recovery determination unit 84 when a predetermined time period elapses after the outputting of the permission signal x0 is terminated.

Due to this, it is possible to prevent a state from continuing for a long time, in which the operation of the operation determination unit 83 is recovered but the recovery signal u from the recovery determination unit 84 is not outputted, that is, a state of remaining in the dead zone range S13 in FIG. 15. In other words, it is possible to prevent an unnecessary load shedding command from being outputted continuously.

As described above, according to the first embodiment, detection of voltage drop of the system voltage resulting from the reactive power characteristic is performed based on the voltage drop and the voltage drop rate of the system voltage in a plurality of upper substations connected by transmission network, therefore, it is possible to perform detection suitably even if a plurality of power transmission lines are configured in a network.

Further, both the voltage drop in the long time region of the order of several seconds to several minutes and the voltage drop in the short time region of the order of several seconds are detected separately, therefore, a wide detection is enabled. Furthermore, loads are shed selectively from the portions where a drop in the load voltage is large in accordance with the respective voltage drop characteristics of the voltage drop in the long time region and the voltage drop in the short time region, or a malfunction resulting from the voltage drop due to a system failure etc. is prevented, therefore, it is possible to suitably detect and recover the voltage drop in the system voltage resulting from the reactive power characteristic.

Figure 16:
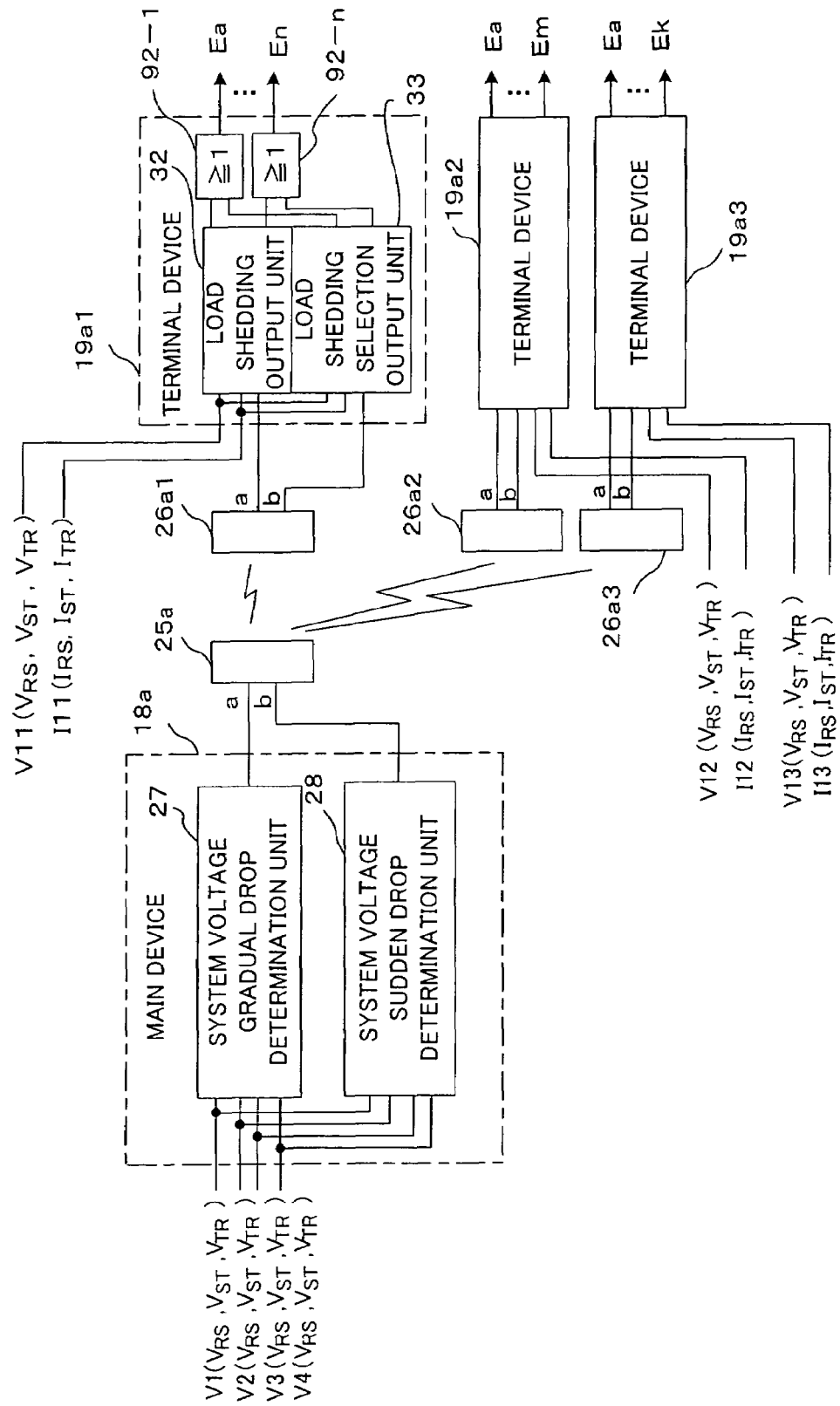
FIG. 16 is a configuration diagram of a power system protection system according to a second embodiment of the present invention.

Next, a second embodiment of the present invention is explained. FIG. 16 is a configuration diagram of a system voltage protection system according to the second embodiment of the present invention. The second embodiment differs from the first embodiment shown in FIG. 1 in that the operation-prioritized selection unit 29 and the output permission unit 30 are omitted from the main device 18a. The same symbols are attached to the same components as those in FIG. 1 and duplicated explanation is omitted.

The operation-prioritized selection unit 29 outputs the operation-prioritized selection signal c so that the system voltage gradual drop determination signal a of the system voltage gradual drop determination unit 27 of its own is selected with priority in the terminal devices 19a1 to 19a3 when the voltage drop in the system voltage of the upper substation of its own is comparatively large. However, the bus-bars of the plurality of upper substations are connected by transmission network, therefore, the system voltage of the upper substation of its own is recovered eventually even if the load connected to other upper substation is shed first. Therefore, no problem will be brought about even if the operation-prioritized selection unit 29 is not provided in particular, therefore, the operation-prioritized selection unit 29 is not provided in the second embodiment.

Further, the output permission unit 30 determines whether or not the voltage sudden drop results from the reactive power characteristic and outputs the output permission signal d when the voltage sudden drop results from the reactive power characteristic. In other words, there may be the case where the voltage sudden drop occurs when shedding of a point of failure fails in the event of system failure, therefore, the above voltage sudden drop is identified from the voltage sudden drop in this case. However, when removal of failure fails by a primary protection relay in the event of system failure, the failure is removed within about a second by a backup protection protective relay and a voltage sudden drop is unlikely to continue for a long time. Therefore, no problem will be brought about even if the output permission unit 30 is not provided in particular, therefore, the output permission unit 30 is not provided in the second embodiment.

Figure 17:
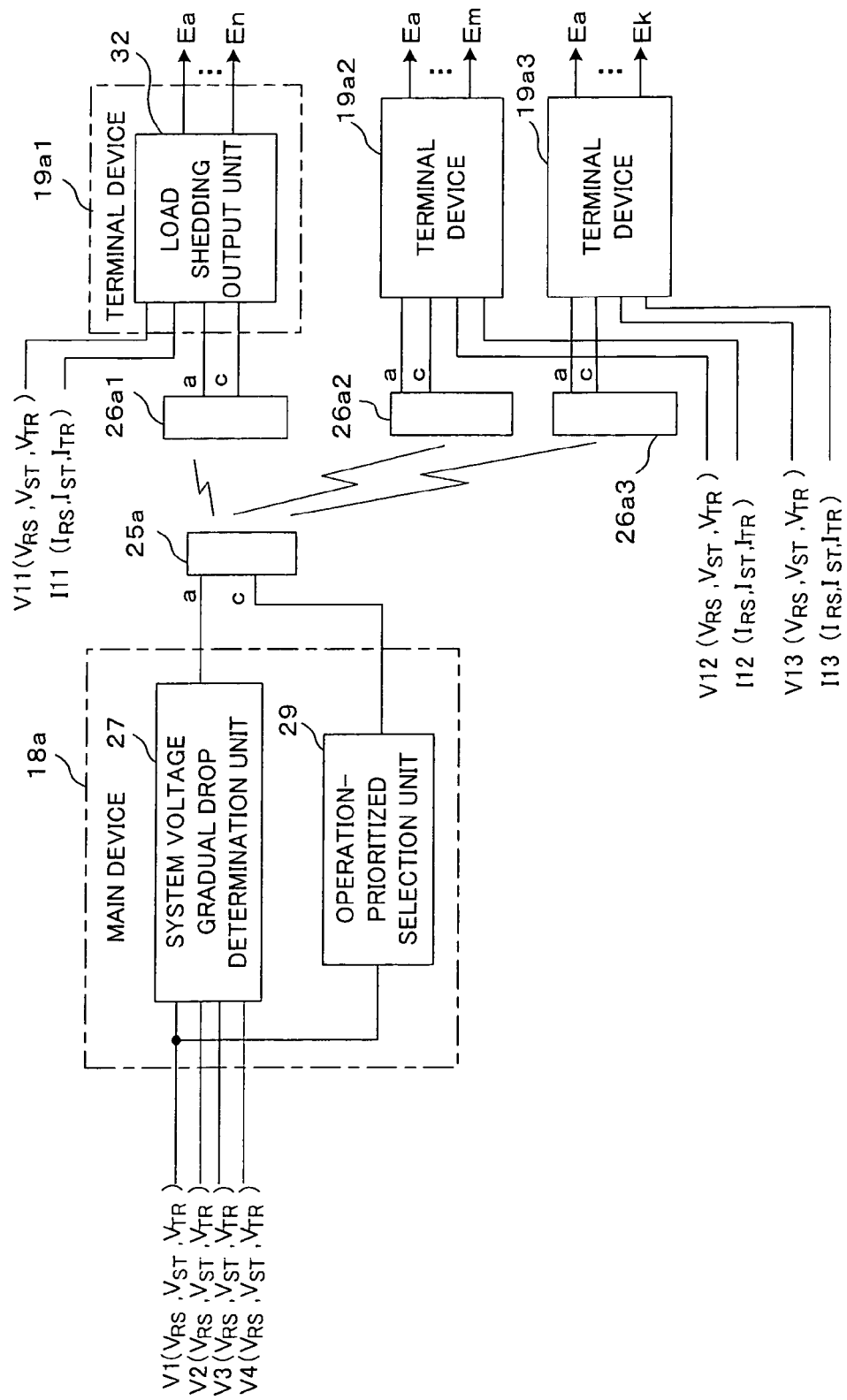
FIG. 17 is a configuration diagram showing another example of the power system protection system according to the second embodiment of the present invention.
Figure 18:
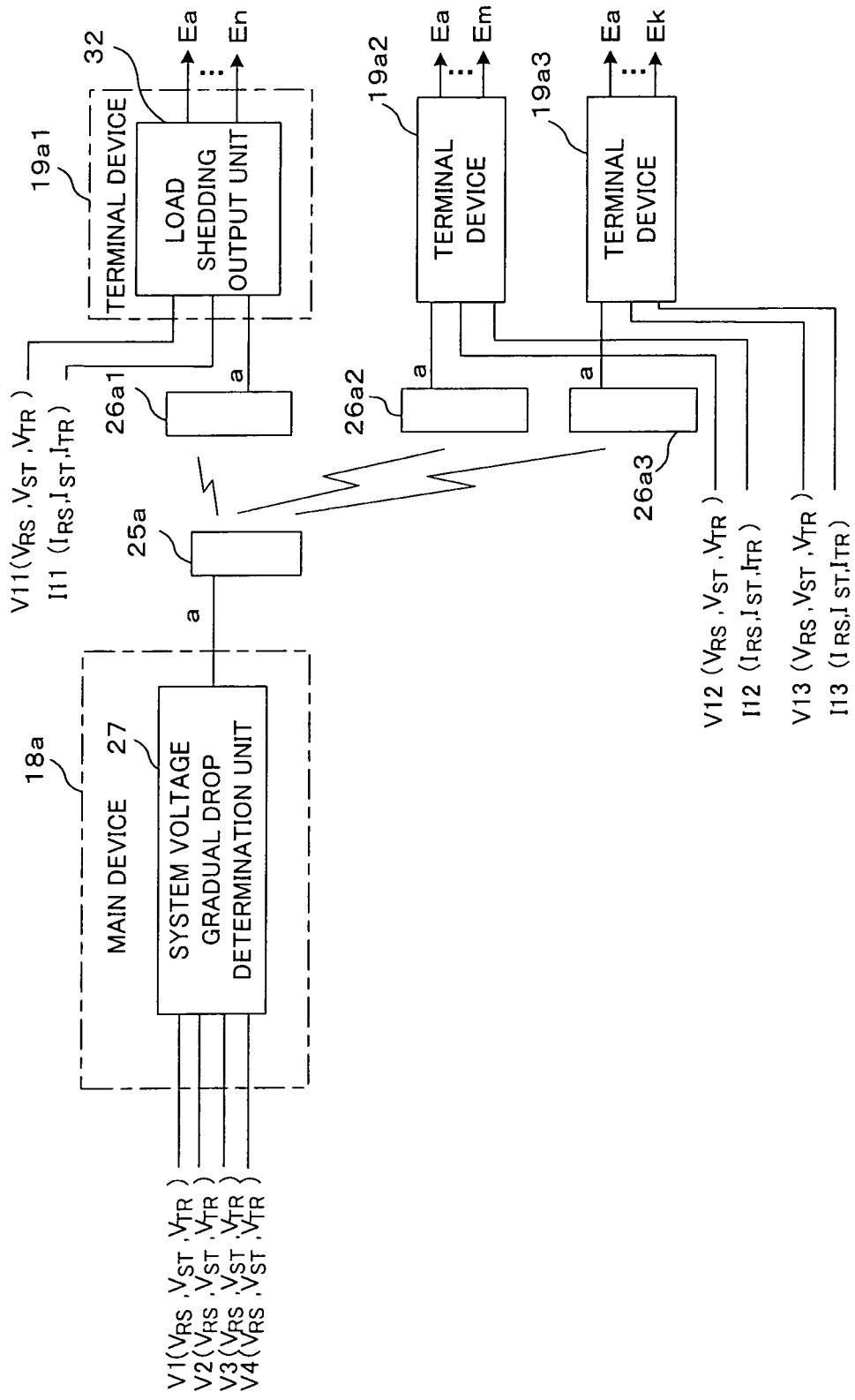
FIG. 18 is a configuration diagram showing another example of the power system protection system according to the second embodiment of the present invention.
Figure 19:
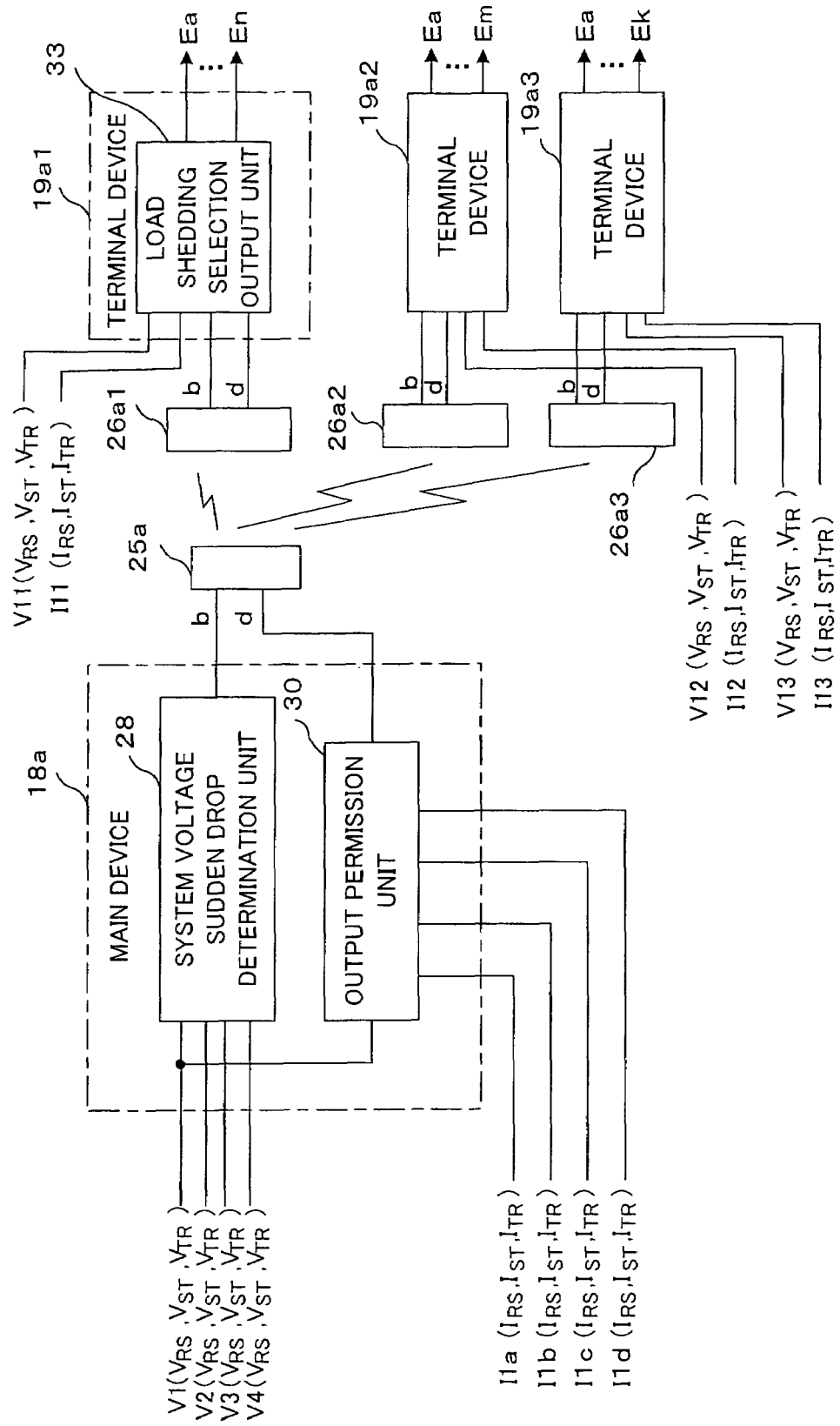
FIG. 19 is a configuration diagram showing still another example of the power system protection system according to the second embodiment of the present invention.
Figure 20:
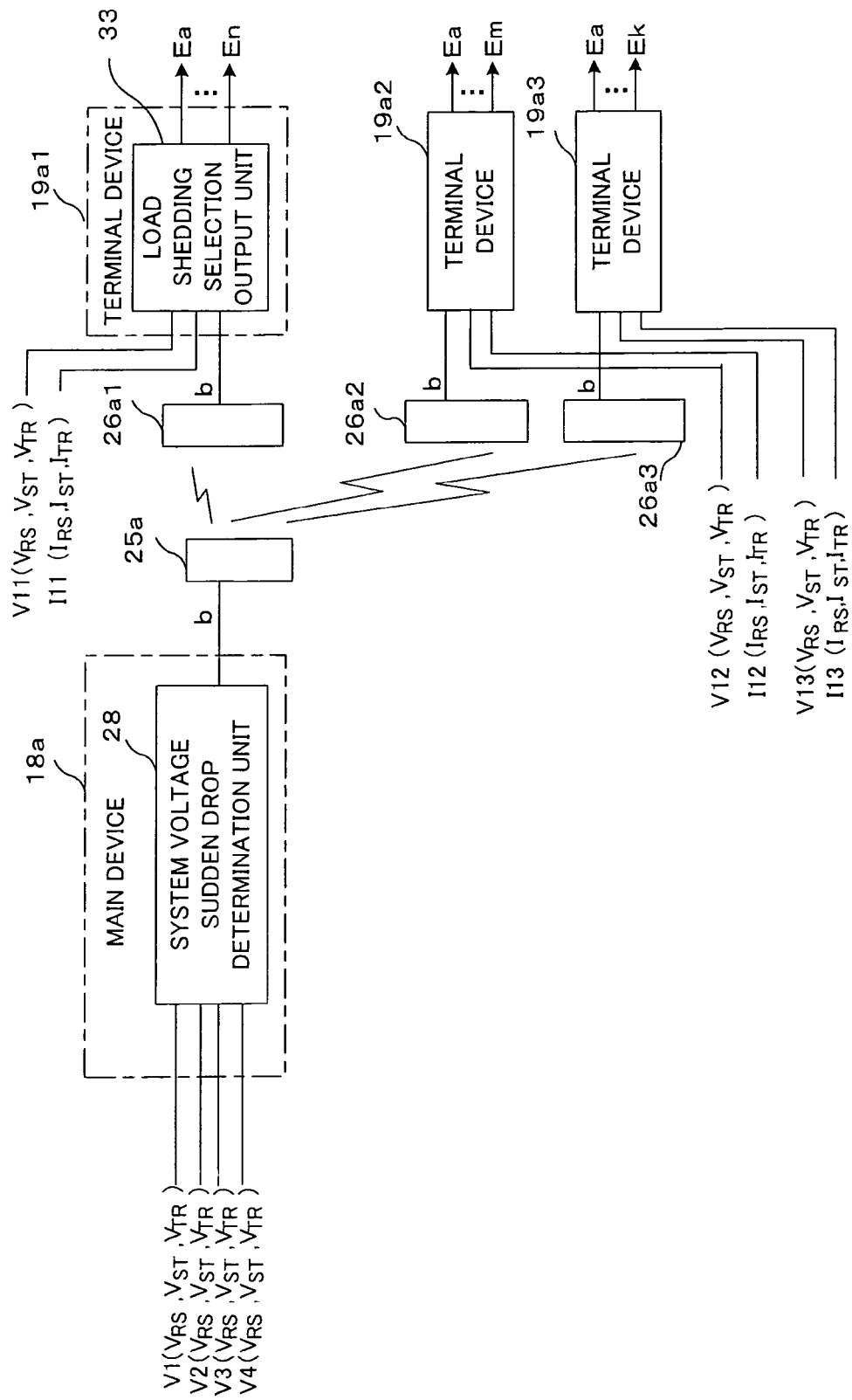
FIG. 20 is a configuration diagram showing still another example of the power system protection system according to the second embodiment of the present invention.

Further, the main device 18a may be one that has the system voltage gradual drop detection unit 27 and the operation-prioritized selection unit 29 as shown in FIG. 17, or one that has only the system voltage gradual drop detection unit 27 as shown in FIG. 18, or one that has the system voltage sudden drop detection unit 28 and the output permission unit 30 as shown in FIG. 19, or one that has only the system voltage sudden drop detection unit 28 as shown in FIG. 20. For example, when there is a demand for detection of a voltage drop in a long time region of a system voltage, the system voltage gradual drop detection unit 27 is provided, when there is a demand for detection of a voltage drop in a short time region of a system voltage, the system voltage sudden drop detection unit 28 is provided, when there is a demand for operation with priority when a voltage drops comparatively quickly, the operation-prioritized selection unit 29 is provided, and when there is a demand for prevention of operation when a voltage drops suddenly when shedding fails in the event of failure etc., the output permission unit 30 is provided.

According to the second embodiment, the power system protection system can be configured by suitably combining the system voltage gradual drop detection unit 27, the system voltage sudden drop detection unit 28, the operation-prioritized selection unit 29, and the output permission unit 30 in accordance with the system configuration of the power system or the characteristic of the power system, therefore, it is possible to perform an optimum detection of a voltage drop in accordance with a power system.

Figure 21:
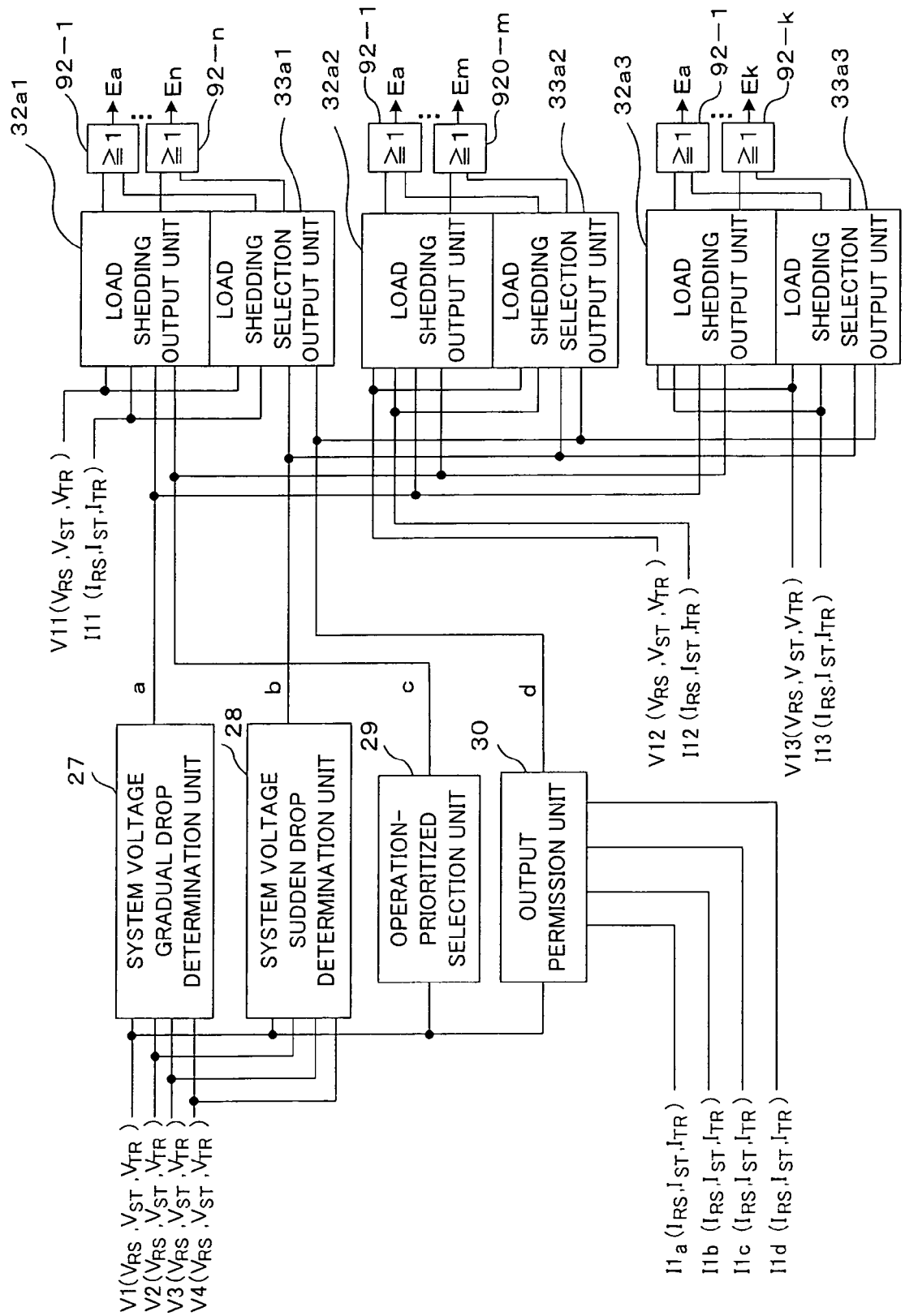
FIG. 21 is a configuration diagram of a power system protection system according to a third embodiment of the present invention.

Next, a third embodiment of the present invention is explained. FIG. 21 is a configuration diagram of the system voltage protection system according to the third embodiment of the present invention. The third embodiment differs from the first embodiment shown in FIG. 1 in that application is made possible to the case when power is supplied directly to loads without a lower substation in between from one or a plurality of substations in a power system. In other words, power is supplied to loads directly from the substation of its own, therefore, the main device 18a and the terminal devices 19a1 to 19a3 are integrated into one unit. The same symbols are attached to the same components as those in FIG. 1 and duplicated explanation is omitted.

In FIG. 21, the system voltage gradual drop determination signal a from the system voltage gradual drop determination unit 27 and the operation-prioritized selection signal c from the operation-prioritized selection unit 29 are inputted to load shedding output units 32a1 to 32a3. When inputting both the system voltage gradual drop determination signal a and the operation-prioritized selection signal c, the load shedding output units 32a1 to 32a3 sequentially shed loads starting from those suffering more from the influence of the voltage drop resulting from the reactive power characteristic.

In addition, the system voltage sudden drop determination signal b from the system voltage sudden drop determination unit 28 and the output permission signal d from the output permission unit 30 are inputted to load shedding selection output units 33a1 to 33a3. When inputting the system voltage sudden drop determination signal and the output permission signal, the load shedding selection output units 33a1 to 33a3 select loads causing the voltage sudden drop resulting from the reactive power characteristic and sequentially shed the selected loads.

Due to this, even in the case where power is directly supplied to loads from the substation of its own, it is possible to detect a voltage drop, perform load shedding for the voltage drop, and recover the voltage of the power system.

Figure 22:
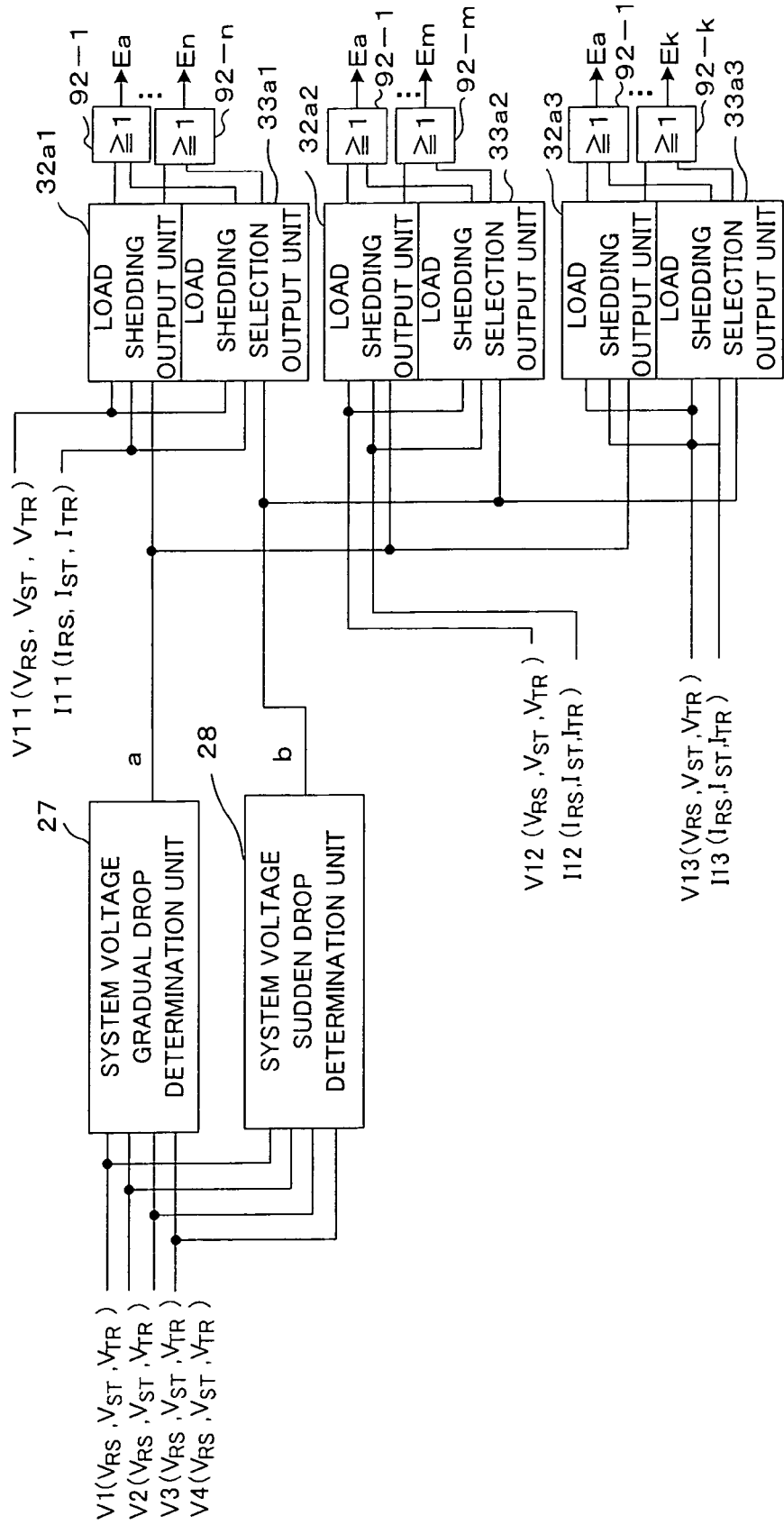
FIG. 22 is a configuration diagram showing another example of the power system protection system according to the third embodiment of the present invention.
Figure 23:
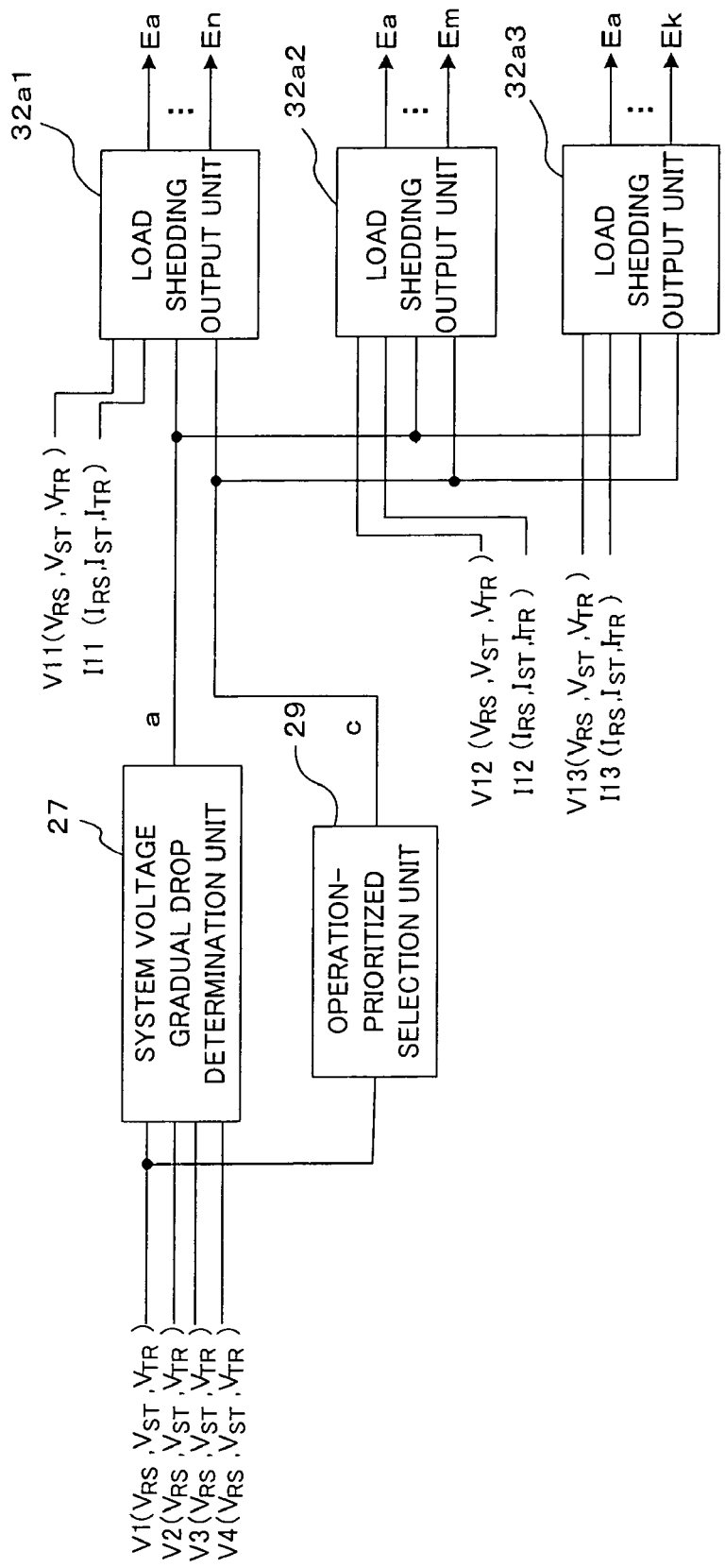
FIG. 23 is a configuration diagram showing another example of the power system protection system according to the third embodiment of the present invention.
Figure 24:
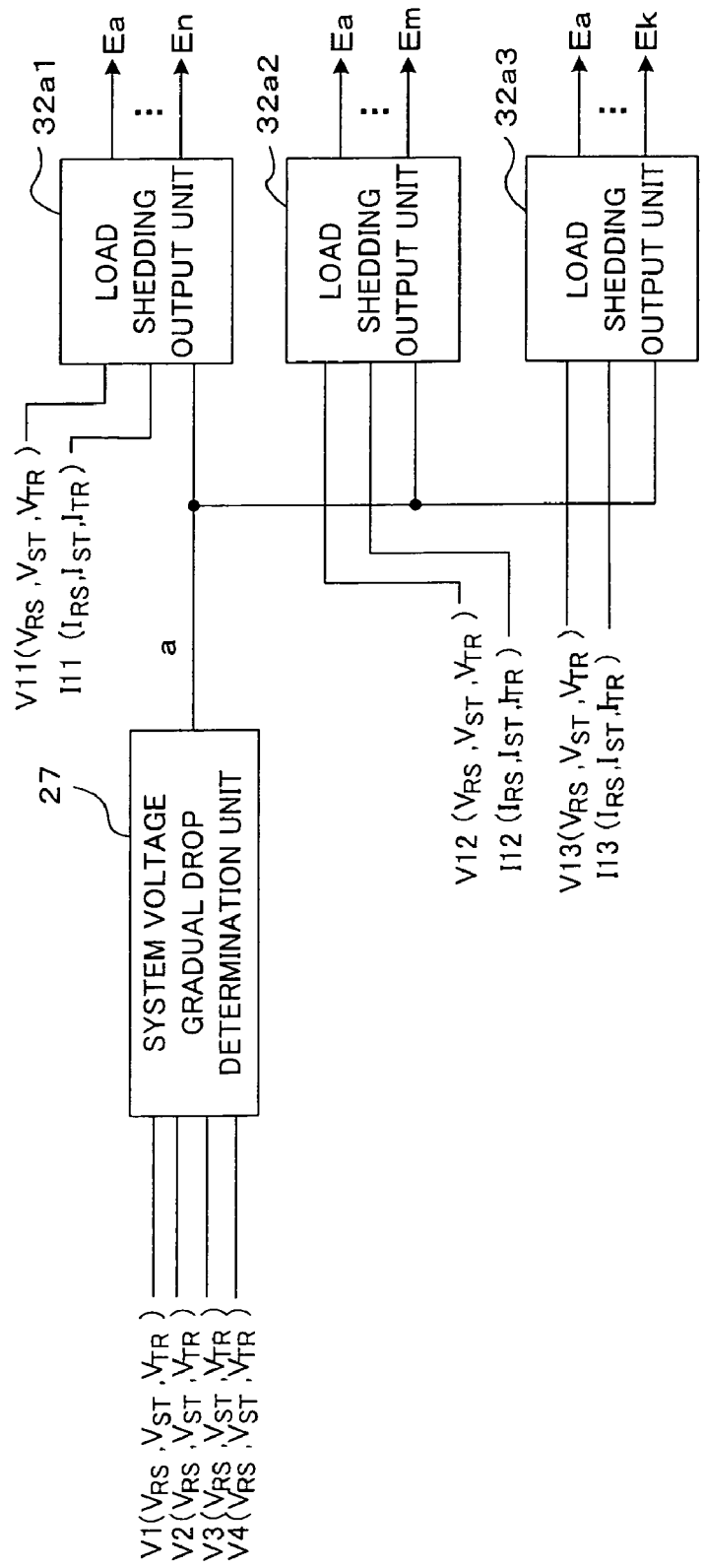
FIG. 24 is a configuration diagram showing still another example of the power system protection system according to the third embodiment of the present invention.
Figure 25:
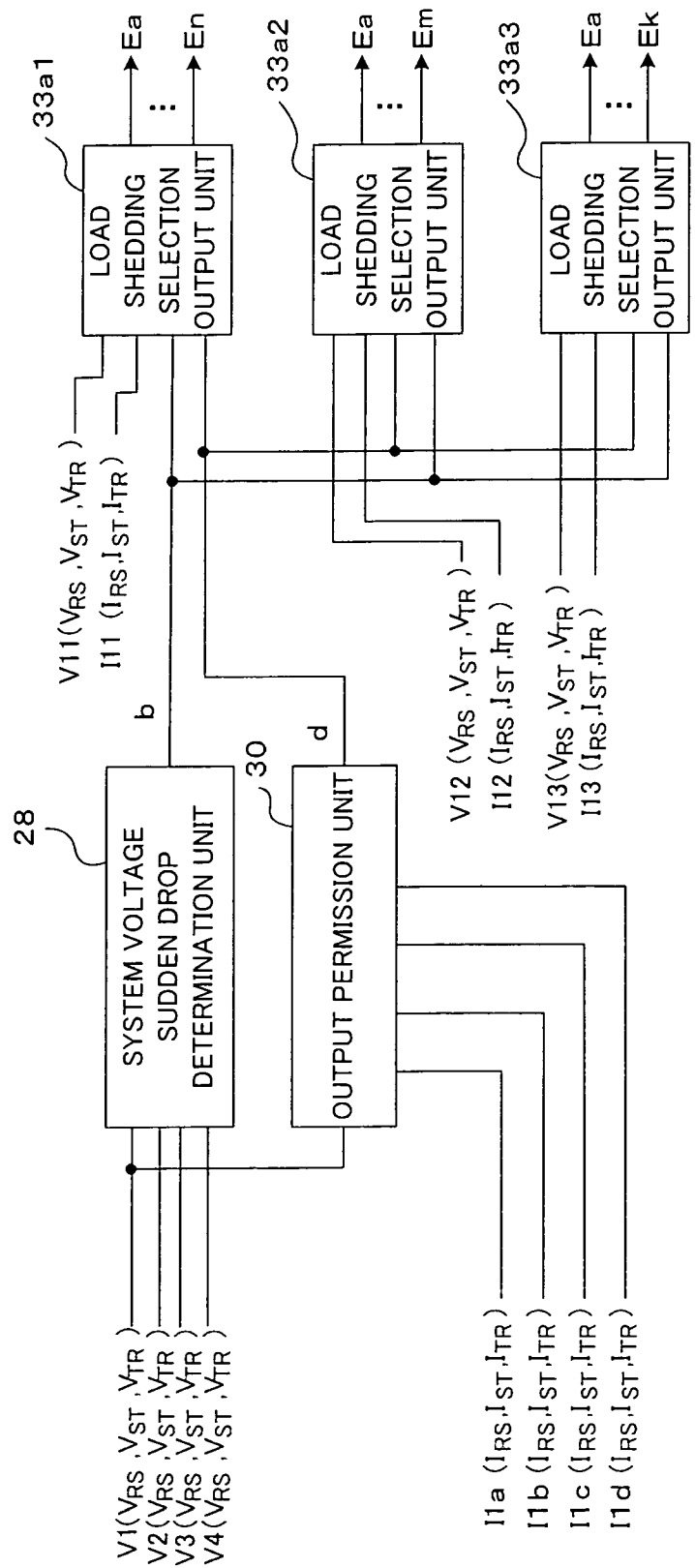
FIG. 25 is a configuration diagram showing still another example of the power system protection system according to the third embodiment of the present invention.
Figure 26:
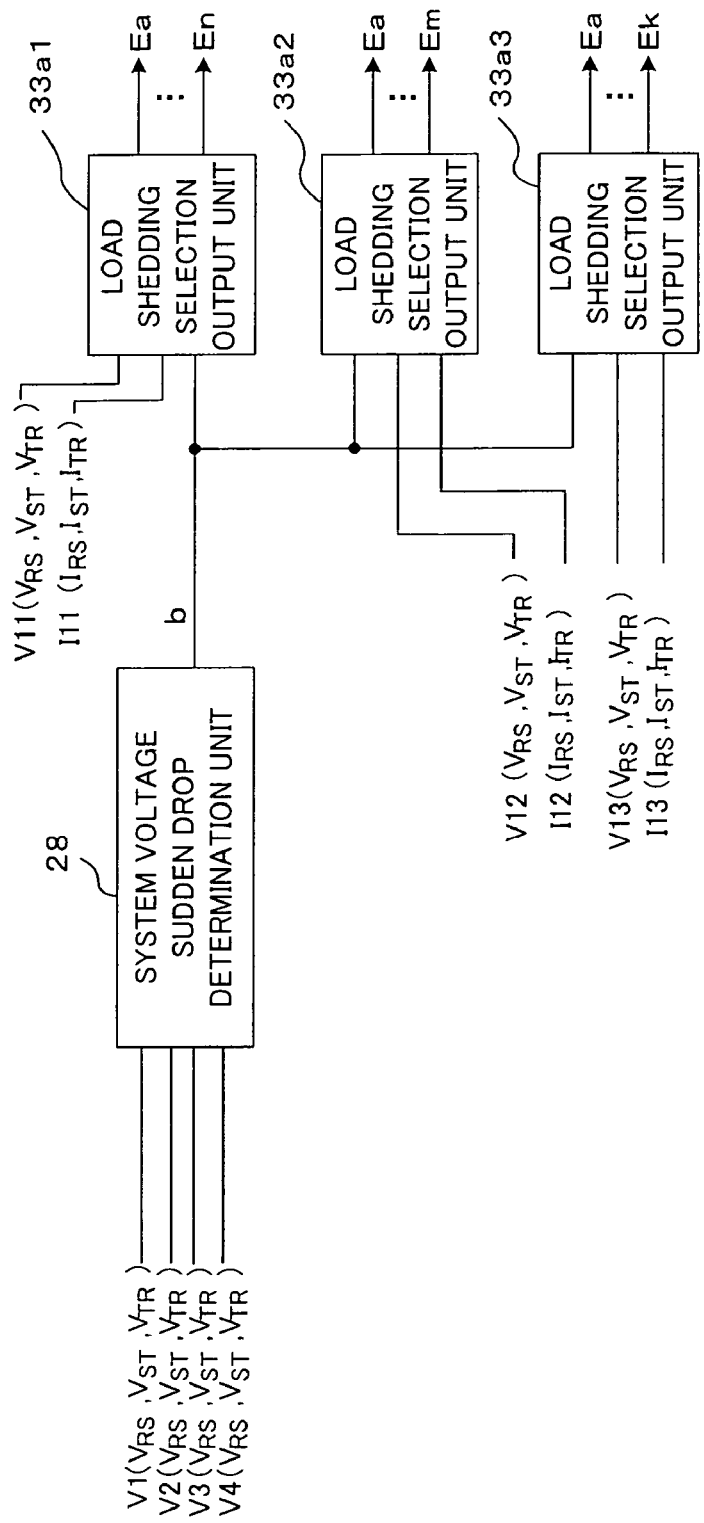
FIG. 26 is a configuration diagram showing still another example of the power system protection system according to the third embodiment of the present invention.

Further, the power system protection system may be one shown in FIG. 21, from which the operation-prioritized selection unit 29 and the output permission unit 30 are omitted as shown in FIG. 22, or one that has the system voltage gradual drop detection unit 27, the operation-prioritized selection unit 29, and the load shedding output units 32a1 to 32a3 as shown in FIG. 23, or one that has the system voltage gradual drop detection unit 27 and the load shedding output units 32a to 32a3 as shown in FIG. 24, or one that has the system voltage sudden drop detection unit 28, the output permission unit 30, and the load shedding selection output units 33a1 to 33a3 shown in FIG. 25, and one that has the system voltage sudden drop detection unit 28 and the load shedding selection output units 33a1 to 33a3 as shown in FIG. 26.

For example, when there is a demand for detection of a voltage drop in a long time region of a system voltage, the system voltage gradual drop detection unit 27 is provided, when there is a demand for detection of a voltage drop in a short time region of a system voltage, the system voltage sudden drop detection unit 28 is provided, when there is a demand for operation with priority when a voltage drops comparatively quickly, the operation-prioritized selection unit 29 is provided, and when there is a demand for prevention of operation when a voltage drops suddenly when shedding fails in the event of failure etc., the output permission unit 30 is provided.

According to the third embodiment, the power system protection system can be configured by suitably combining the system voltage gradual drop detection unit 27, the system voltage sudden drop detection unit 28, the operation-prioritized selection unit 29, and the output permission unit 30 in accordance with the system configuration of the power system in which power is supplied to loads directly from the substation of its own or the characteristic of the power system, therefore, it is possible to perform an optimum detection of a voltage drop in accordance with a power system.

INDUSTRIAL APPLICABILITY

As described above, the power system protection system according to the present invention can be applied to detection of a voltage drop resulting form the reactive power characteristic of the system voltage of an upper substation. Further, the voltage drop resulting from the reactive power characteristic is detected based on the voltage drop and the voltage drop rate of the system voltage of the upper substation, therefore, the power system protection system is suitable for detection of a voltage drop resulting from the reactive power characteristic of the power system connected by transmission network.

The invention claimed is:

1. A power system protection system for stably operating a power system, comprising:
   a main device for acquiring a system electric quantity of one or a plurality of upper substations of said power system; and
   a terminal device for acquiring a system electric quantity of one or a plurality of lower substations that receives power from said upper substation and supplies power to loads, wherein:
   said main device includes:
   a system voltage gradual drop determination unit that outputs a system voltage gradual drop determination signal when the voltage drop rate in a long time region exceeds a predetermined value based on a three-phase voltage of the power system and terminates the outputting of said system voltage gradual drop determination signal when the three-phase voltage of the power system exceeds a voltage recovery set value;
   a system voltage sudden drop determination unit that outputs a system voltage sudden drop determination signal when the voltage drop rate in a short time region exceeds a predetermined value based on a three-phase voltage of the power system and terminates the outputting of said system voltage sudden drop determination signal when the three-phase voltage of the power system exceeds the voltage recovery set value;
   an operation-prioritized selection unit that outputs an operation-prioritized selection signal early when the voltage drop in the three-phase voltage of the power system is large and outputs the operation-prioritized selection signal late when the voltage drop is small; and
   an output permission unit that outputs an output permission signal in the event of the voltage sudden drop resulting from a reactive power characteristic, and wherein
   said terminal device includes:
   a load shedding output unit that sequentially sheds loads starting from those of the lower substations suffering more from the influence of the voltage drop resulting from the reactive power characteristic when receiving the system voltage gradual drop determination signal and the operation-prioritized selection signal from said main device; and
   a load shedding selection output unit that selects loads causing the voltage sudden drop resulting from the reactive power characteristic and sequentially sheds the selected loads when receiving said system voltage sudden drop determination signal and said output permission signal from said main device.

2. The power system protection system according to claim 1, wherein said system voltage gradual drop determination unit has predetermined values that become smaller from a short determination time region of a voltage gradual drop toward a long determination time region in a long time region, and quickly detects a large voltage drop rate in the short determination time region and detects a small voltage drop rate in the long determination time region.

3. The power system protection system according to claim 1, wherein said system voltage sudden drop determination unit terminates the outputting of said system voltage sudden drop determination signal when a short circuit fault or a grounding fault is detected.

4. The power system protection system according to claim 1, wherein said output permission unit determines that the voltage sudden drop results from the reactive power characteristic and outputs said output permission signal when a load impedance viewed from said upper substation toward said lower substation falls within a predetermined range based on three-phase voltage and current of the power system.

5. The power system protection system according to claim 1, wherein said load shedding output unit determines the influence of the voltage drop resulting from the reactive power characteristic based on both or at least one of a load voltage and a load power factor of the loads connected to said lower substation and sequentially sheds loads starting from those of the lower substations suffering more from the influence of the voltage drop resulting from the reactive power characteristic.

6. The power system protection system according to claim 5, wherein said load shedding output unit outputs a load shedding command earlier for said lower substations having a lower load voltage and a smaller load power factor by shortening its time limit operation.

7. The power system protection system according to claim 1, wherein said load shedding selection output unit selects loads causing the voltage sudden drop resulting from the reactive power characteristic based on both or at least one of a load voltage and a load power factor of the loads connected to said lower substation and sequentially sheds the selected loads.

8. The power system protection system according to claim 1, wherein the voltage recovery set value of said system voltage gradual drop determination unit or said system voltage sudden drop determination unit is a voltage higher than the system voltage at which said system voltage gradual drop determination unit or said system voltage sudden drop determination unit has operated.

9. A power system protection system for stably operating a power system, comprising:
   a main device for acquiring a system electric quantity of one or a plurality of upper substations of said power system; and
   a terminal device for acquiring a system electric quantity of one or a plurality of lower substations that receives power from said upper substation and supplies power to loads, wherein:
   said main device includes:
   a system voltage gradual drop determination unit that outputs a system voltage gradual drop determination signal when a voltage drop rate in a long time region exceeds a predetermined value based on a three-phase voltage of the power system and terminates the outputting of said system voltage gradual drop determination signal when the three-phase voltage of the power system exceeds a voltage recovery set value; and
   a system voltage sudden drop determination unit that outputs a system voltage sudden drop determination signal when a voltage drop rate in a short time region exceeds a predetermined value based on a three-phase voltage of the power system and terminates the outputting of said system voltage sudden drop determination signal when the three-phase voltage of the power system exceeds the voltage recovery set value, and wherein
   said terminal device includes:
   a load shedding output unit that sequentially sheds loads starting from those of the lower substations suffering more from the influence of the voltage drop resulting from a reactive power characteristic when receiving the system voltage gradual drop determination signal from said main device; and
   a load shedding selection output unit that sequentially sheds loads for which load shedding is permitted when receiving said system voltage sudden drop determination signal from said main device.

10. The power system protection system according to claim 9, wherein said system voltage gradual drop determination unit has predetermined values that become smaller from a short determination time region of a voltage gradual drop toward a long determination time region in a long time region, and quickly detects a large voltage drop rate in the short determination time region and detects a small voltage drop rate in the long determination time region.

11. The power system protection system according to claim 9, wherein said system voltage sudden drop determination unit terminates the outputting of said system voltage sudden drop determination signal when a short circuit fault or a grounding fault is detected.

12. The power system protection system according to claim 9, wherein said load shedding output unit determines the influence of the voltage drop resulting from the reactive power characteristic based on both or at least one of a load voltage and a load power factor of the loads connected to said lower substation and sequentially sheds loads starting from those of the lower substations suffering more from the influence of the voltage drop resulting from the reactive power characteristic.

13. The power system protection system according to claim 12, wherein said load shedding output unit outputs a load shedding command earlier for said lower substations having a lower load voltage and a smaller load power factor by shortening its time limit operation.

14. The power system protection system according to claim 9, wherein said load shedding selection output unit selects loads causing the voltage sudden drop resulting from the reactive power characteristic based on both or at least one of a load voltage and a load power factor of the loads connected to said lower substation and sequentially sheds the selected loads.

15. The power system protection system according to claim 9, wherein the voltage recovery set value of said system voltage gradual drop determination unit or said system voltage sudden drop determination unit is a voltage higher than the system voltage at which said system voltage gradual drop determination unit or said system voltage sudden drop determination unit has operated.

16. A power system protection system for stably operating a power system, comprising:
a main device for acquiring a system electric quantity of one or a plurality of upper substations of said power system; and
a terminal device for acquiring a system electric quantity of one or a plurality of lower substations that receives power from said upper substation and supplies power to loads, wherein:
said main device includes:
a system voltage gradual drop determination unit that outputs a system voltage gradual drop determination signal when the voltage drop rate in a long time region exceeds a predetermined value based on a three-phase voltage of the power system and terminates the outputting of said system voltage gradual drop determination signal when the three-phase voltage of the power system exceeds a voltage recovery set value; and
an operation-prioritized selection unit that outputs an operation-prioritized selection signal early when the voltage drop in the three-phase voltage of the power system is large and outputs the operation-prioritized selection signal late when the voltage drop is small, and wherein said terminal device includes:
a load shedding output unit that sequentially sheds loads starting from those of the lower substations suffering more from the influence of the voltage drop resulting from a reactive power characteristic when receiving both the system voltage gradual drop determination signal and said operation-prioritized selection signal from said main device.

17. The power system protection system according to claim 16, wherein said system voltage gradual drop determination unit has predetermined values that become smaller from a short determination time region of a voltage gradual drop toward a long determination time region in a long time region, and quickly detects a large voltage drop rate in the short determination time region and detects a small voltage drop rate in the long determination time region.

18. The power system protection system according to claim 16, wherein said load shedding output unit determines the influence of the voltage drop resulting from the reactive power characteristic based on both or at least one of a load voltage and a load power factor of the loads connected to said lower substation and sequentially sheds loads starting from those of the lower substations suffering more from the influence of the voltage drop resulting from the reactive power characteristic.

19. The power system protection system according to claim 18, wherein said load shedding output unit outputs a load shedding command earlier for said lower substations having a lower load voltage and a smaller load power factor by shortening its time limit operation.

20. The power system protection system according to claim 16, wherein the voltage recovery set value of said system voltage gradual drop determination unit is a voltage higher than the system voltage at which said system voltage gradual drop determination unit has operated.

21. A power system protection system for stably operating a power system, comprising:
a main device for acquiring a system electric quantity of one or a plurality of upper substations of said power system; and
a terminal device for acquiring a system electric quantity of one or a plurality of lower substations that receives power from said upper substation and supplies power to loads, wherein:
said main device includes a system voltage gradual drop determination unit that outputs a system voltage gradual drop determination signal when the voltage drop rate in a long time region exceeds a predetermined value based on a three-phase voltage of the power system and terminates the outputting of said system voltage gradual drop determination signal when the three-phase voltage of the power system exceeds a voltage recovery set value; and
said terminal device includes:
a load shedding output unit that sequentially sheds loads starting from those of the lower substations suffering more from the influence of the voltage drop resulting from a reactive power characteristic when receiving the system voltage gradual drop determination signal from said main device.

22. The power system protection system according to claim 21, wherein said system voltage gradual drop determination unit has predetermined values that become smaller from a short determination time region of a voltage gradual drop toward a long determination time region in a long time region, and quickly detects a large voltage drop rate in the short determination time region and detects a small voltage drop rate in the long determination time region.

23. The power system protection system according to claim 21, wherein said load shedding output unit determines the influence of the voltage drop resulting from the reactive power characteristic based on both or at least one of a load voltage and a load power factor of the loads connected to said lower substation and sequentially sheds loads starting from those of the lower substations suffering more from the influence of the voltage drop resulting from the reactive power characteristic.

24. The power system protection system according to claim 23, wherein said load shedding output unit outputs a load shedding command earlier for said lower substations having a lower load voltage and a smaller load power factor by shortening its time limit operation.

25. The power system protection system according to claim 21, wherein the voltage recovery set value of said system voltage gradual drop determination unit is a voltage higher than the system voltage at which said system voltage gradual drop determination unit has operated.

26. A power system protection system for stably operating a power system, comprising:
   a main device for acquiring a system electric quantity of one or a plurality of upper substations of said power system; and
   a terminal device for acquiring a system electric quantity of one or a plurality of lower substations that receives power from said upper substation and supplies power to loads, wherein:
   said main device includes:
   a system voltage sudden drop determination unit that outputs a system voltage sudden drop determination signal when the voltage drop rate in a short time region exceeds a predetermined value based on a three-phase voltage of the power system and terminates the outputting of said system voltage sudden drop determination signal when the three-phase voltage of the power system exceeds the voltage recovery set value; and
   an output permission unit that outputs an output permission signal in the event of the voltage sudden drop resulting from a reactive power characteristic, and wherein
   said terminal device includes:
   a load shedding selection output unit that selects loads causing the voltage sudden drop resulting from the reactive power characteristic and sequentially sheds the selected loads when receiving said system voltage sudden drop determination signal and said output permission signal from said main device.

27. The power system protection system according to claim 26, wherein said system voltage sudden drop determination unit terminates the outputting of said system voltage sudden drop determination signal when a short circuit fault or a grounding fault is detected.

28. The power system protection system according to claim 26, wherein said output permission unit determines that the voltage sudden drop results from the reactive power characteristic and outputs said output permission signal when a load impedance viewed from said upper substation toward said lower substation falls within a predetermined range based on three-phase voltage and current of the power system.

29. The power system protection system according to claim 28, wherein said load shedding selection output unit selects loads causing the voltage sudden drop resulting from the reactive power characteristic based on both or at least one of a load voltage and a load power factor of the loads connected to said lower substation and sequentially sheds the selected loads.

30. The power system protection system according to claim 26, wherein the voltage recovery set value of said system voltage sudden drop determination unit is a voltage higher than the system voltage at which said system voltage sudden drop determination unit has operated.

31. A power system protection system for stably operating a power system, comprising:
   a main device for acquiring a system electric quantity of one or a plurality of upper substations of said power system; and
   a terminal device for acquiring a system electric quantity of one or a plurality of lower substations that receives power from said upper substation and supplies power to loads, wherein:
   said main device includes a system voltage sudden drop determination unit that outputs a system voltage sudden drop determination signal when the voltage drop rate in a short time region exceeds a predetermined value based on a three-phase voltage of the power system and terminates the outputting of said system voltage sudden drop determination signal when the three-phase voltage of the power system exceeds the voltage recovery set value; and
   said terminal device includes a load shedding selection output unit that selects loads causing the voltage sudden drop resulting from a reactive power characteristic and sequentially sheds the selected loads when receiving said system voltage sudden drop determination signal from said main device.

32. The power system protection system according to claim 31, wherein said system voltage sudden drop determination unit terminates the outputting of said system voltage sudden drop determination signal when a short circuit fault or a grounding fault is detected.

33. The power system protection system according to claim 31, wherein said load shedding selection output unit selects loads causing the voltage sudden drop resulting from the reactive power characteristic based on both or at least one of a load voltage and a load power factor of the loads connected to said lower substation and sequentially sheds the selected loads.

34. The power system protection system according to claim 31, wherein the voltage recovery set value of said system voltage sudden drop determination unit is a voltage higher than the system voltage at which said system voltage sudden drop determination unit has operated.

35. A power system protection system for stably operating a power system, comprising:
   a system voltage gradual drop determination unit that outputs a system voltage gradual drop determination signal when the voltage drop rate in a long time region exceeds a predetermined value based on a three-phase voltage of the power system of one or a plurality of substations of said power system and terminates the outputting of said system voltage gradual drop determination signal when the three-phase voltage of the power system exceeds a voltage recovery set value;
   a system voltage sudden drop determination unit that outputs a system voltage sudden drop determination signal when the voltage drop rate in a short time region exceeds a predetermined value based on a three-phase voltage of the power system and terminates the outputting of said system voltage sudden drop determination signal when the three-phase voltage of the power system exceeds the voltage recovery set value;
   an operation-prioritized selection unit that outputs an operation-prioritized selection signal early when the voltage drop in the three-phase voltage of the power system is large and outputs the operation-prioritized selection signal late when the voltage drop is small;

an output permission unit that outputs an output permission signal in the event of the voltage sudden drop resulting from a reactive power characteristic;

a load shedding output unit that sequentially sheds loads starting from those suffering more from the influence of the voltage drop resulting from the reactive power characteristic when inputting said system voltage gradual drop determination signal and operation-prioritized selection signal: and a load shedding selection output unit that selects loads causing the voltage sudden drop resulting from the reactive power characteristic and sequentially sheds the selected loads when inputting said system voltage sudden drop determination signal and said output permission signal.

36. A power system protection system for stably operating a power system, comprising:

a system voltage gradual drop determination unit that outputs a system voltage gradual drop determination signal when the voltage drop rate in a long time region exceeds a predetermined value based on a three-phase voltage of the power system of one or a plurality of substations of said power system and terminates the outputting of said system voltage gradual drop determination signal when the three-phase voltage of the power system exceeds a voltage recovery set value;

a system voltage sudden drop determination unit that outputs a system voltage sudden drop determination signal when the voltage drop rate in a short time region exceeds a predetermined value based on a three-phase voltage of the power system and terminates the outputting of said system voltage sudden drop determination signal when the three-phase voltage of the power system exceeds a voltage recovery set value;

a load shedding output unit that sequentially sheds loads starting from those suffering more from the influence of the voltage drop resulting from a reactive power characteristic when inputting said system voltage gradual drop determination signal; and a load shedding selection output unit that sheds loads for which load shedding is permitted when inputting said system voltage sudden drop determination signal.

37. A power system protection system for stably operating a power system, comprising:

a system voltage gradual drop determination unit that outputs a system voltage gradual drop determination signal when the voltage drop rate in a long time region exceeds a predetermined value based on a three-phase voltage of the power system of one or a plurality of substations of said power system and terminates the outputting of said system voltage gradual drop determination signal when the three-phase voltage of the power system exceeds a voltage recovery set value;

an operation-prioritized selection unit that outputs an operation-prioritized selection signal early when the voltage drop in the three-phase voltage of the power system is large and outputs the operation-prioritized selection signal late when the voltage drop is small; and a load shedding output unit that sequentially sheds loads starting from those suffering more from the influence of the voltage drop resulting from a reactive power characteristic when inputting both said system voltage gradual drop determination signal and said operation-prioritized selection signal.

38. A power system protection system for stably operating a power system, comprising:

a system voltage gradual drop determination unit that outputs a system voltage gradual drop determination signal when the voltage drop rate in a long time region exceeds a predetermined value based on a three-phase voltage of the power system of one or a plurality of substations of said power system and terminates the outputting of said system voltage gradual drop determination signal when the three-phase voltage of the power system exceeds a voltage recovery set value; and a load shedding output unit that sequentially sheds loads starting from those suffering more from the influence of the voltage drop resulting from a reactive power characteristic when inputting said system voltage gradual drop determination signal.

39. A power system protection system for stably operating a power system, comprising:

a system voltage sudden drop determination unit that outputs a system voltage sudden drop determination signal when the voltage drop rate in a short time region exceeds a predetermined value based on a three-phase voltage of the power system of one or a plurality of substations of said power system and terminates the outputting of said system voltage sudden drop determination signal when the three-phase voltage of the power system exceeds a voltage recovery set value;

an output permission unit that outputs an output permission signal in the event of the voltage sudden drop resulting from a reactive power characteristic; and a load shedding selection output unit that selects loads causing the voltage sudden drop resulting from the reactive power characteristic and sequentially sheds the selected loads when inputting said system voltage sudden drop determination signal and said output permission signal.

40. A power system protection system for stably operating a power system, comprising:

a system voltage sudden drop determination unit that outputs a system voltage sudden drop determination signal when the voltage drop rate in a short time region exceeds a predetermined value based on a three-phase voltage of the power system of one or a plurality of substations of said power system and terminates the outputting of said system voltage sudden drop determination signal when the three-phase voltage of the power system exceeds a voltage recovery set value; and a load shedding selection output unit that selects loads causing the voltage sudden drop resulting from a reactive power characteristic and sequentially sheds the selected loads when inputting said system voltage sudden drop determination signal.

* * * * *